(12) United States Patent
Agarwal et al.

(10) Patent No.: US 12,326,891 B2
(45) Date of Patent: Jun. 10, 2025

(54) GENERATING A PRODUCT ONTOLOGY BASED UPON QUERIES IN A SEARCH ENGINE LOG

(71) Applicant: Microsoft Technology Licensing, LLC, Redmond, WA (US)

(72) Inventors: Manoj Kumar Agarwal, Hyderabad (IN); Jatin Khurana, Uttar Pradesh (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 632 days.

(21) Appl. No.: 17/533,036

(22) Filed: Nov. 22, 2021

(65) Prior Publication Data
US 2023/0118171 A1 Apr. 20, 2023

Related U.S. Application Data

(60) Provisional application No. 63/250,994, filed on Sep. 30, 2021.

(51) Int. Cl.
*G06F 40/205* (2020.01)
*G06F 16/35* (2019.01)
(Continued)

(52) U.S. Cl.
CPC ........... *G06F 16/35* (2019.01); *G06F 16/367* (2019.01); *G06F 18/231* (2023.01); *G06F 40/40* (2020.01)

(58) Field of Classification Search
CPC .... G06F 40/30; G06F 16/367; G06F 16/3338; G06F 16/3344; G06F 40/20; G06F 16/248; G06F 16/322; G06F 16/9024; G06F 16/9538; G06F 16/338; G06F 16/9038; G06F 16/24; G06F 16/953
See application file for complete search history.

(56) References Cited

U.S. PATENT DOCUMENTS 6,085,220 A 7/2000 Courts et al.
7,765,178 B1 * 7/2010 Roizen ................. G06F 16/951
707/999.005
(Continued)

OTHER PUBLICATIONS

Ahmadvand, et al., "DeepCAT: Deep Category Representation for Query Understanding in E-commerce Search", In Repository of arXiv:2104.11760v2, May 10, 2021, 5 Pages.
(Continued)

*Primary Examiner* — Olujimi A Adesanya
(74) *Attorney, Agent, or Firm* — CALFEE, HALTER & GRISWOLD LLP

(57) ABSTRACT

Technologies relating to construction of a product ontology based upon queries in a search engine log are described. Candidate phrases are extracted from queries in the search engine log. The candidate phrases are partitioned to generate candidate product classes, where the candidate phrases are partitioned by sequentially expanding the ending phrases of the candidate product phrases. Using such an ending phrase-based approach naturally forms a hierarchy of candidate product classes. Embeddings are generated for the candidate product classes, and the candidate product classes are clustered based upon the embeddings such that semantically equivalent product classes are merged.

20 Claims, 12 Drawing Sheets

(51) Int. Cl.
*G06F 16/36* (2019.01)
*G06F 18/231* (2023.01)
*G06F 40/289* (2020.01)
*G06F 40/40* (2020.01)

(56) References Cited

U.S. PATENT DOCUMENTS

| | | | |
|---|---|---|---|
| 7,881,984 | B2 | 2/2011 | Kane et al. |
| 8,086,480 | B2 | 12/2011 | Deo et al. |
| 9,218,392 | B1* | 12/2015 | Zgraggen ............... G06F 16/335 |
| 9,928,466 | B1* | 3/2018 | Sarmento ............ G06F 16/3346 |
| 10,049,163 | B1* | 8/2018 | Sarmento ............ G06F 16/9535 |
| 10,290,125 | B2* | 5/2019 | Awadallah .......... G06F 16/3322 |
| 10,657,181 | B2* | 5/2020 | Saha .................... G06F 16/9024 |
| 11,042,920 | B2 | 6/2021 | Moudgil et al. |
| 11,048,564 | B2 | 6/2021 | Dhondse et al. |
| 11,049,167 | B1 | 6/2021 | Kim et al. |
| 11,055,268 | B2 | 7/2021 | Labian |
| 11,055,345 | B2 | 7/2021 | Gattiker et al. |
| 11,055,723 | B2 | 7/2021 | Prendki |
| 11,301,540 | B1* | 4/2022 | Boteanu ................. G06F 40/279 |
| 2005/0144162 | A1* | 6/2005 | Liang .................... G06F 16/355 |
| 2007/0203929 | A1* | 8/2007 | Bolivar ............... G06F 16/3338 |
| 2007/0220037 | A1* | 9/2007 | Srivastava ............ G06F 16/951 707/999.102 |
| 2011/0314011 | A1* | 12/2011 | Buehrer ............... G06F 16/9566 707/769 |
| 2013/0013580 | A1* | 1/2013 | Geller .................... G06F 16/951 707/706 |
| 2013/0275466 | A1* | 10/2013 | Xiao ................. G06F 16/90335 707/769 |
| 2013/0290366 | A1* | 10/2013 | Boyle ................. G06F 16/3344 707/767 |
| 2016/0275585 | A1 | 9/2016 | Scoggins |
| 2019/0095537 | A1* | 3/2019 | Zhong ................. G06F 16/9535 |
| 2019/0155961 | A1* | 5/2019 | Alonso ................. G06F 16/951 |
| 2020/0110784 | A1* | 4/2020 | Sharma .............. G06Q 30/0633 |
| 2021/0073224 | A1* | 3/2021 | Zhao ................... G06F 16/2282 |
| 2021/0157870 | A1* | 5/2021 | Di Fabbrizio ......... G06N 3/049 |
| 2021/0224841 | A1* | 7/2021 | Kumar ................ G06F 16/3344 |
| 2022/0277373 | A1* | 9/2022 | Bender ............... G06F 16/9024 |

OTHER PUBLICATIONS

Ahmadvand, et al., "JointMap: Joint Query Intent Understanding for Modeling Intent Hierarchies in E-commerce Search", in Proceedings of the 43rd International ACM SIGIR Conference on Research and Development in Information Retrieval, Jul. 25, 2020, pp. 1509-1512.

Hao, et al., "P-Companion: A Principled Framework for Diversified Complementary Product Recommendation", in Proceedings of the 29th ACM International Conference on Information & Knowledge Management, Oct. 19, 2020, pp. 1-8.

Luo, et al., "AliCoCo: Alibaba e-commerce cognitive concept net", in Proceedings of the ACM SIGMOD International Conference on Management of Data, Jun. 14, 2020, pp. 313-327.

Su, et al., "User Intent, Behaviour, and Perceived Satisfaction in Product Search", in Proceedings of the Eleventh ACM International Conference on Web Search and Data Mining, Feb. 5, 2018, pp. 547-555.

Tsagkias, et al., "Challenges and Research Opportunities in eCommerce Search and Recommendations", in ACM SIGIR Forum, vol. 54, Issue 1, Jun. 2020, 24 Pages.

Wang, et al., "Enquire One's Parent and Child Before Decision: Fully Exploit Hierarchical Structure for Self-Supervised Taxonomy Expansion", in Proceedings of the Web Conference, Apr. 19, 2021, pp. 3291-3304.

Zhao, et al., "A Dynamic Product-aware Learning Model for E-commerce Query Intent Understanding", in Proceedings of the 28th ACM International Conference on Information and Knowledge Management, Nov. 3, 2019, pp. 1843-1852.

Gysel, Christophe Van., "Remedies against the Vocabulary Gap in Information Retrieval", in PhD thesis, University of Amsterdam, 2017, 177 Pages.

* cited by examiner

GENERATING A PRODUCT ONTOLOGY BASED UPON QUERIES IN A SEARCH ENGINE LOG

RELATED APPLICATION

This application claims priority to U.S. Provisional Application No. 63/250,994, filed on Sep. 30, 2021, and entitled "GENERATING A PRODUCT ONTOLOGY BASED UPON QUERIES IN A SEARCH ENGINE LOG". The entirety of this application is incorporated herein by reference.

BACKGROUND

An ontology is a set of concepts and categories in a subject area or domain that shows properties of the concepts and categories and the relations between them. In a computer-implemented electronic commerce (e-commerce) application, a product ontology is employed to classify products that are available for acquisition to end users by way of the e-commerce application. A product ontology for an e-commerce application may be quite large; for instance, a product ontology for a conventional e-commerce application includes over 35,000 different product classes, where each product class represents a real-world concept that is typically associated with a product by humans. Example product classes include "tennis racket", "talcum powder", "computer keyboards", etc.

A product ontology is typically hierarchical in nature, where most products classes are children of higher-level product classes. For instance, in the conventional e-commerce application there are approximately 30 root-level product classes, including "electronics", "clothing", "sports and outdoors", etc. These root-level product classes tend to provide information that is too coarse to properly describe products; for instance, a television and a refrigerator both belong to the root level category "electronics". Each root-level product class includes numerous sub-classes. As noted above, a conventional e-commerce application employs an ontology that includes approximately 35,000 subclasses in connection with offering products for acquisition to end users of the e-commerce application.

Conventional computer-implemented approaches relating to product ontologies are limited in that such approaches rely upon an existing, manually generated product ontology, where the conventional approaches are directed towards expanding such ontologies. An example conventional approach is directed towards discovering additional or new parent-child relationships amongst product classes in an existing ontology. Therefore, again, conventional computer-implemented technologies relating to product ontology discovery rely upon existence of a human-created ontology. Hence, there are no suitable existing computer-implemented technologies for automating discovery of a product ontology, where the product ontology is well-suited for use by an e-commerce application.

SUMMARY

The following is a brief summary of subject matter that is described in greater detail herein. This summary is not intended to be limiting as to the scope of the claims.

Described herein are various technologies pertaining to discovering (generating) a product ontology based upon queries submitted by users to an e-commerce application and/or a computer-implemented search engine. Generating and updating a product ontology through use of computing devices is an incredibly difficult technical problem, as doing so includes programming a computer system to discover a comprehensive set of product classes and programming the computer system to monitor for new products. Further, generating the product ontology includes discovering relationships between product classes. Discovering relationships between product classes includes discovering hierarchical relationships between product classes (e.g., determining whether a class is a sub-class of some other class). Discovering relationships between product classes also includes determining whether two product classes categorize similar products, as well as determining how similar two product classes are to one another.

Due to complexities with computer-generation of product ontologies, existing product ontologies have been manually constructed by humans, which has resulted in use of terms that are imperfect or that describe too many or too few products. Assignation of different real-world concepts to a same product class adversely impacts the ability of computing technologies to understand information about products assigned to such classes. In addition, assignation of different real-world concepts to a same product class adversely impacts the ability of computing technologies to understand needs of end users who wish to acquire products that are being offered for acquisition by an e-commerce application.

There are numerous technical challenges related to building a product ontology. For instance, there are currently billions of products of various types that relate to millions of real-world concepts, where each product has numerous attributes. Therefore, employing computing technologies to define a schema for an ontology is nontrivial. Further, new products are constantly being introduced, where the new products may not correspond to an existing product class in a created product ontology. Hence, maintaining freshness and completeness of a product ontology is incredibly challenging. Further, data pertaining to product classes tends to be included in unstructured product catalogs, rendering it difficult to analyze such data to automate generation of an ontology based upon the product catalogs.

Several computing operations are performed in connection with generating a product ontology based upon queries submitted by users to an e-commerce application and/or a computer-implemented search engine. The queries can be provided to a classifier, where the classifier is configured to output an indication as to whether or not an intent of an issuer of a query is directed towards acquiring information about a product. For instance, with respect to a received query, the classifier can output a confidence value that an intent of an issuer of the query is to acquire information about a product. Queries having confidence values assigned thereto that are above a threshold can be selected for use in connection with creating the product ontology. In a relatively popular search engine and/or e-commerce application, there may be millions of queries submitted to the search engine and/or e-commerce application by users thereof over a relatively short period of time, where the queries relate to millions of different products that belong to tens of thousands of different product classes.

Queries that likely pertain to products are provided to a tagger module, where the tagger module, with respect to a received query, is configured to assign a label to each keyword in the query. A label assigned to a keyword by the tagger module is indicative of whether or not the keyword is likely to pertain to a product class. In an example, the tagger module receives the query "lawn mower blades replacement", and the tagger module assigns a respective label to each keyword in the query to indicate whether or not the keyword is likely related to a product class. Continuing with the example set forth above, the tagger module labels the words "lawn", "mower", and "blades" as likely relating to a product class and labels the keyword "replacement" as likely not being related to a product class.

For each query that has been subjected to the tagging described above, keywords that are tagged as being related to a product class are arranged in a sequence, where the sequence corresponds to an order that the keywords occurred in the query. Thus, continuing with the example query set forth above, the candidate phrase "lawn mower blades" is formed. Subsequently, based upon the candidate phrases, candidate product classes are identified. For a single keyword candidate phrase, such phrase is a candidate product class. For a multi-keyword candidate phrase, multiple candidate product classes are identified, where an ending phrase of the multi-keyword candidate phrase is sequentially expanded to form candidate product classes. With respect to the example candidate phrase "lawn mower blades", candidate product classes "blades", "mower blades", and "lawn mower blades" are formed by sequentially expanding the ending phrase of the candidate phrase.

The candidate product classes may then be subjected to "cleaning." For instance, the candidate product classes can be cleaned by normalizing keywords in the candidate product classes based upon tense, singular/plural, and/or form of the keywords. For example, keywords are normalized to the present tense, keywords are normalized based upon keyword suffixes (e.g., "ing" can be altered to "er" in most cases), noun and pronoun keywords are normalized to be singular nouns and pronouns where appropriate, and so forth. This cleaning may result in several different candidate product classes being combined.

The resultant candidate product classes can be further cleaned based upon analysis of beginning phrases of the candidate product classes. For example, when a same beginning phrase co-occurs across numerous candidate product classes, it can be presumed that the beginning phrase is a brand name or an adjective that is not specific to a candidate product class. When a beginning phrase co-occurs across a threshold number of candidate product classes and/or across a threshold percentage of candidate product classes, the beginning phrase can be removed from such product classes (potentially resulting in further candidate product classes being combined).

The remaining candidate product classes can be still further cleaned based upon counts assigned to the candidate product classes. More specifically, a number of queries from which each of the candidate product classes was extracted is counted. Candidate product classes having counts below a first threshold are likely too specific to be product classes in a finalized product ontology. For instance, a candidate product class that was extracted from a single query is likely to be too specific to be a product class in the finalized product ontology. Similarly, a candidate product class having a count that is above a second threshold and that has at least one candidate product class that is a child thereof is likely too general to be a leaf node in the finalized product ontology. Continuing with the example set forth above, the candidate product class "blades" may have a count that is above the second threshold, and further has child candidate product classes "mower blades" and "lawn mower blades". Because the candidate product class "blades" has children, and further because the count of the candidate product class "blades" is above the threshold, the candidate product class "blades" can be prevented from being a leaf node in the finalized ontology.

Cleaning of the candidate product classes results in a hierarchical ontology, which includes root nodes that represent single keywords and child nodes that represent phrases that have the individual keywords as ending phrases (and potentially intermediate nodes that represent phrases that have individual keywords as ending phrases and that are themselves ending phrases of a product class represented by a leaf node in the ontology). For instance, "mower blades" is a child of "blades", and "lawn mower blades" is a child of "mower blades".

Embedding (using any suitable embedding technique) is then performed on each of the candidate product classes in the ontology, such that each candidate product class is represented by a numeric vector. Based upon the embeddings, candidate product classes that are children in the ontology to a common node are clustered (e.g., using any suitable clustering technique), and candidate product classes that belong to the same cluster can be merged together. For instance, the candidate product classes "notebook computer" and "laptop computer" may be clustered together and merged. Hence, product classes that are semantically similar (equivalent or close to equivalent) are merged with one another, and the product class in the cluster that was extracted from the most queries can be selected as the representative product class of the cluster. Thus, a product ontology with hierarchical relationships defined therein is output.

Upon the product ontology being output, further processing can be performed to identify relationships between product classes in the product ontology (e.g., whether one product class is closely related to another product class, tangentially related to another product class, etc.). Pursuant to an example, the product classes can be subjected to embedding, where the embedding for a product class is based upon the top N queries from which the product class was extracted. Other embedding techniques are also contemplated. An approximate nearest neighbor (ANN) table is generated based upon the embeddings, such that for a given product class, some threshold number of "closest" product classes can be identified. For the given product class, the top threshold number of closest product classes is ranked based upon distances between the closest product classes and the given product class. As will be described in greater detail herein, the product classes can be re-ranked based upon search results returned to users, where the search results were generated by a search engine based upon the queries referenced above. More specifically, similarity scores are computed for a product class and some threshold number of closest product classes, and the threshold number of closest product classes is re-ranked based upon the similarity scores.

The ontology and computed relationships can be utilized in a variety of computer-implemented applications. In an example, relationships between product classes are employed to provide suggested queries to users who set forth queries. For instance, a search engine receives a query, and a product class included in the ontology is extracted from the query. Based upon the product class being included in the ontology, a related product class is identified, and a suggested query that includes the related product class is returned to the user. The suggested query may help the user explore products that are related to a product referenced in the query. Other applications will be readily contemplated.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
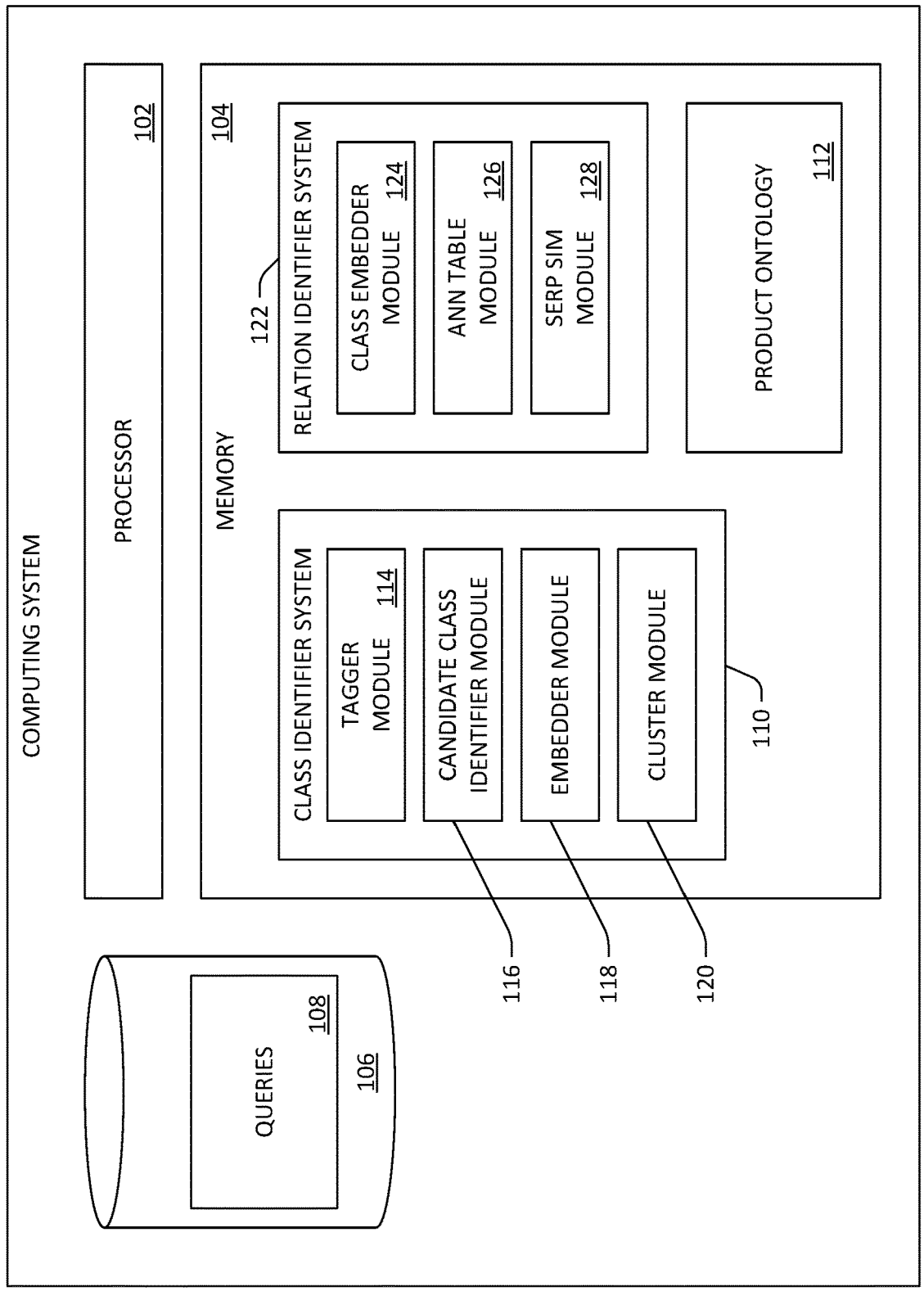
FIG. 1 is a functional block diagram of a computing system that is configured to generate an ontology based upon queries submitted by users to a search engine.

Various technologies pertaining to discovering a product ontology are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Described herein are various technologies pertaining to generating (e.g., automatically) a product ontology based upon queries submitted to a search engine and/or an electronic commerce (e-commerce) website/application by users. The generation of a product ontology based upon queries is an improvement over conventional approaches for generating product ontologies, as the conventional approaches require manual generation of product ontologies. The created product ontology can be employed in several computer-implemented applications, including, but not limited to, training a keyword tagger that is configured to tag keywords in queries with labels that indicate whether or not the keywords are related to products, query understanding, generation of query suggestions, amongst others.

A computer-implemented process for generating a product ontology based upon queries submitted to a search engine and/or e-commerce application/website includes: 1) identifying candidate queries from a log file, where the queries are likely to include keywords or phrases that relate to real-world products; 2) assigning labels (tags) to keywords in the candidate queries, where the labels are indicative of whether or not the keywords are likely to relate to a product; 3) generating candidate phrases based upon keywords in the candidate queries that have been labeled as likely being related to a real-world product; 4) generating candidate product classes based upon the candidate phrases, where the candidate product classes are generated by sequentially expanding ending phrases of the candidate phrases, as will be described in greater detail herein; 5) cleaning the candidate product classes to normalize keywords in the candidate product classes; 6) generating embeddings for the candidate product classes; 7) clustering candidate product classes based upon the embeddings of the candidate product classes; 8) merging candidate product classes that belong to a same cluster to form a hierarchical product ontology; 9) identifying similar product classes in the ontology, where an amount of similarity between product classes in the ontology is computed. The actions referenced above will be described in greater detail below.

Referring now to FIG. 1, a functional block diagram of an example computing system 100 that is configured to construct (e.g., automatically) a product ontology is illustrated. The product ontology includes numerous product classes that relate to real-world products, where the created product ontology includes hierarchical relationships, such that product classes that are leaf nodes in the product ontology are children of another product class.

The computing system 100 includes a processor 102 and memory 104 that includes systems and modules that are executed by the processor 102. The computing system 100 also includes a data store 106 that includes queries 108 that have been previously submitted to a computer-implemented application by end users of the computer-implemented application. For instance, the computer-implemented application is a search engine. In another example, the computer-implemented application is an e-commerce application that offers products for acquisition to end users. In yet another example, the computer-implemented application is a website of a company that offers products for acquisition to end users. As will be described in greater detail herein, the queries 108 can be identified as likely including phrases that relate to product classes that are to be included in a product ontology.

Figure 2:
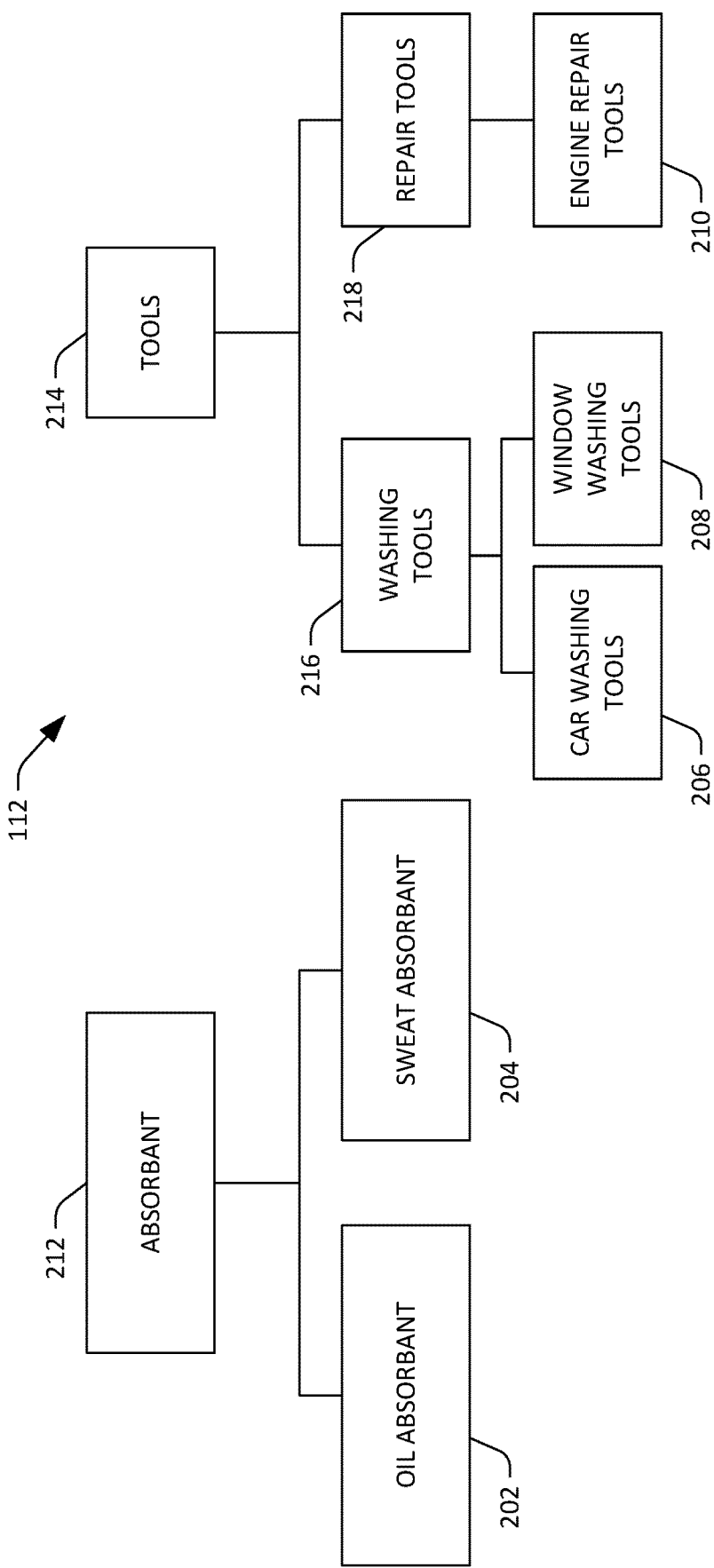
FIG. 2 is a schematic that illustrates a portion of a hierarchical ontology.

The memory 104 includes a class identifier system 110 that is configured to generate a product ontology 112 automatically based upon the queries 108 in the data store 106. Referring briefly to FIG. 2, a portion of the product ontology 112 that is generated by the class identifier system 110 is depicted. The product ontology 112 includes several product classes 202-210 that are leaf nodes in the ontology 112, where each of the product classes 202-210 represents a real-world concept. The ontology 112 also includes product classes 212 and 214 that are root nodes in the ontology 112, where the product classes 202 and 204 are children of the product class 212 and the product classes 206-210 are children of the product class 214. The ontology 112 further includes product classes 216 and 218, where the product classes 216 and 218 are intermediate nodes in the ontology 112, as such product classes 216 and 218 are children of the product class 214, and where the product classes 206 and 208 are children of the product class 216. Moreover, the product class 210 is a child of the product class 218. Therefore, the ontology 112 includes hierarchical relationships between product classes.

As will be described in greater detail below, hierarchical relationships in the product ontology 112 are identified through use of suffix-based processing, where a product class in the ontology is an ending phrase of a child of the product class. For instance, the parent product class 212 "absorbent" is a suffix of the product classes 202 ("oil absorbent") and 204 ("sweat absorbent"). As used above and herein, the term "suffix" refers to an ending phrase and does not refer to an affix to a word. Similarly, the product class 214 ("tools") is an ending phrase of the product classes 216 ("washing tools") and 218 ("repair tools"). While the portion of the product ontology 112 depicted in FIG. 2 includes five product classes that are leaf nodes, it is to be understood that the product ontology 112 may include tens to hundreds of thousands of product classes that are leaf nodes in the product ontology 112.

Figure 3:
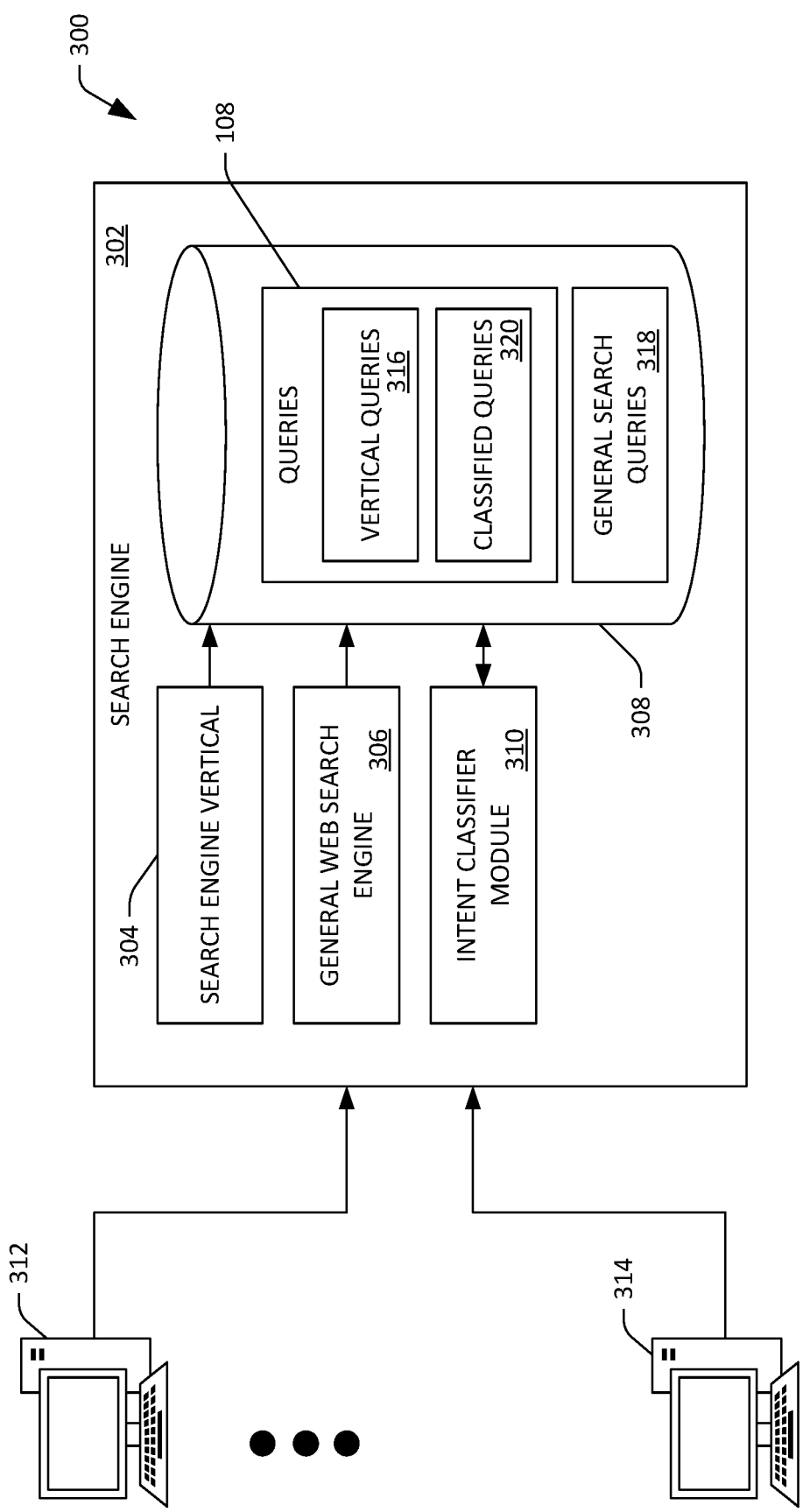
FIG. 3 is a functional block diagram of a search engine that is configured to identify queries that relate to product classes that are to be included in a product ontology.

Now referring to FIG. 3, a functional block diagram of a system 100 that is configured to identify the queries 108 from amongst numerous queries submitted to a search engine 302 is depicted. The system 300 includes the search engine 302, where the search engine 302 includes a search engine vertical 304, and further where users of the search engine 302 access the search engine vertical 304 when attempting to acquire information about products. Thus, the search engine vertical 304 may be a "shopping" vertical. Conventional search engines tend to include numerous verticals, such as "web", "news", "finance", "travel", "images", "shopping", etc. When a user accesses the search engine vertical 304 and submits a query thereto, it can be presumed that the query includes keywords that are related to a product class that is to be included in the product ontology 112.

The search engine 302 also includes a general web search engine 306. Users of the search engine 302 may submit queries looking for particular webpages, information, etc., where the queries may or may not include information relating to a product class that is to be represented in the ontology 112. The search engine 302 also includes a data store 308 that stores a search log, where the search log includes queries submitted to the search engine 302 by users of the search engine 302. Moreover, the search engine 302 includes an intent classifier module 310, where the intent classifier module 310 is configured to receive a query submitted to the general web search engine 306 by a user and output an indication as to whether an intent of the issuer of the query is to acquire information about a product (which may include acquiring the product). For example, the intent classifier module 310 can assign a confidence score to a query, where the confidence score is indicative of a likelihood that the intent of the issuer of the query is to acquire information about a product. Pursuant to an example, the intent classifier module 310 is a machine-learned model that has been trained based upon queries and labels assigned thereto that indicate whether the queries correspond to an intent to acquire information about a product.

An example of operation of the system 300 is now set forth. Several client computing devices 312-314 are operated by users who submit queries to the search engine 302 by way of the computing devices 312-314. When a query received from one of the client computing devices 312-314 is directed to the search engine vertical 304, the search engine vertical 304 assigns a label to the query indicating that the query was directed to the search engine vertical 304, thereby causing such query to be included in the queries 108 employed to construct the product ontology 112. Queries that are directed to the search engine vertical 304 are labeled as vertical queries 316 in FIG. 2 and are retained in the data store 308.

When a query received from one of the client computing devices 312-314 is directed towards the general web search engine 306 (or optionally to another vertical of the search engine 302), the search engine 302 can assign a label to the query indicating that the query is directed towards the general web search engine 306 and can cause such query to be stored in the data store 308 as general search queries 318. Put differently, the general search queries 318 are queries that have been directed to the general web search engine 306 by users of the client computing devices 312-314. The intent classifier module 310 can receive the general search queries 318 and can compute a confidence score for each general search query, where the confidence score is indicative of a likelihood that the general search query was set forth by a user with an intent to acquire information about a product. When the confidence score assigned to the query is above a predefined threshold (e.g., 0.95), the query can be included in classified queries 320 in the data store 308. The queries 108 that are used in connection with constructing the product ontology 112 therefore include the vertical queries 316 and the classified queries 320.

While the system 300 is illustrated as including a search engine 302, with the queries being submitted by users of the search engine 302, it is to be understood that the product ontology 112 can be constructed based upon queries received by an e-commerce application or website. For example, e-commerce applications allow users to submit queries for products to such applications, and return search results that represent products that are available for acquisition in response to receipt of the queries. Hence, the queries 108, instead of being submitted to a search engine by users, may include queries submitted to an e-commerce application by users of the e-commerce application. Further, many companies sell products and/or services by way of websites, where users can submit queries pertaining to products by way of the website. The queries 108, therefore, may include queries submitted to the website by users of the website that are searching for products to acquire, and when reference is made to queries being submitted to a search engine, submission of queries to an e-commerce application or website is intended to be covered.

Figure 4:
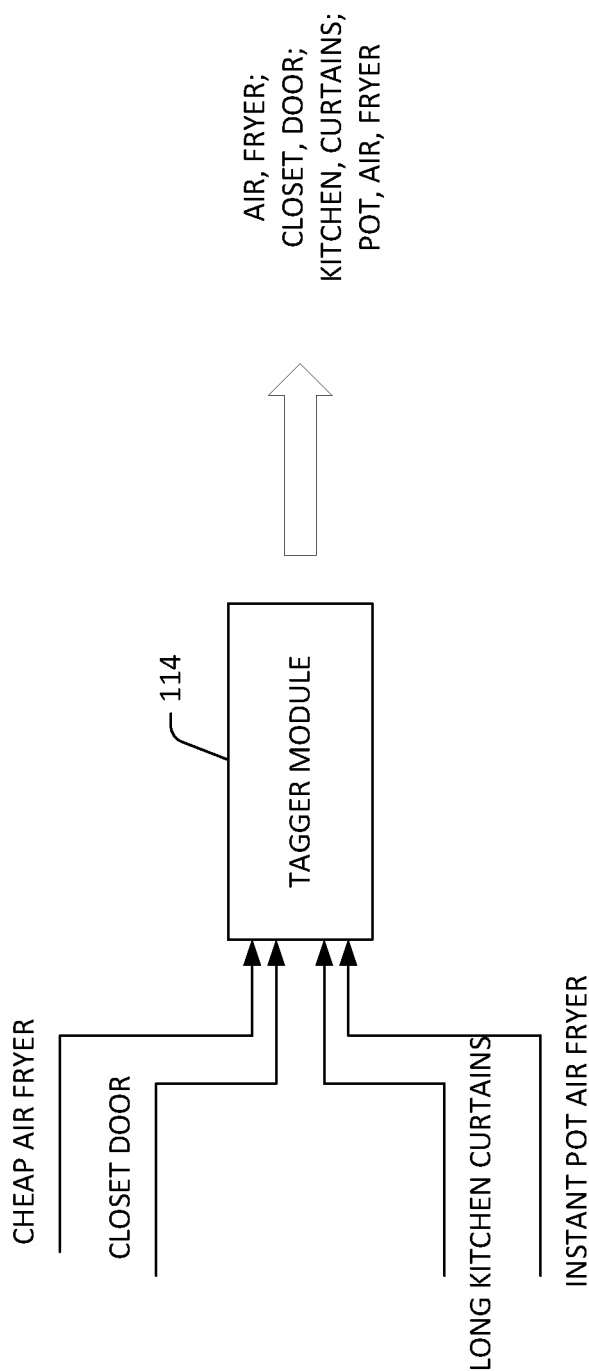
FIG. 4 is a schematic that illustrates operation of a tagger module, where the tagger module assigns labels to keywords in queries, where the labels are indicative of whether or not the keywords relate to product classes.

Returning again to FIG. 1, operation of the class identifier system 110 with respect to the queries 108 is now described. The class identifier system 110 includes a tagger module 114, where the tagger module 114 is configured to assign tags (labels) to keywords in each query of the queries 108. Referring now to FIG. 4, a functional block diagram illustrating operation of the tagger module 114 is depicted. In the example shown in FIG. 4, the tagger module 114 receives four queries from the queries 108. These queries include the queries "cheap air fryer", "closet door", "long kitchen curtains", and "instant pot air fryer". With respect to the query "cheap air fryer", the tagger module 114 assigns labels to the keywords "air" and "fryer" that indicate that such keywords are likely related to a product class that is to be represented in the product ontology 112. The tagger module 114 assigns a label to the keyword "cheap" that indicates that such keyword is not likely to be related to a product class that is to be represented in the product ontology 112. With respect to the query "closet door", the tagger module 114 assigns labels to the keywords "closet" and "door" that indicate that such keywords likely relate to a product class that is to be represented in the product ontology 112.

With respect to the query "long kitchen curtains", the tagger module 114 assigns labels to the keywords "kitchen" and "curtains" that indicate that such keywords likely relate to a product class that is to be represented in the product ontology 112, while the tagger module 114 assigns a label to the keyword "long" that indicates that such keyword does not likely relate to a product class that is to be represented in the product ontology 112. Finally, with respect to the query "instant pot air fryer", the tagger module 114 assigns labels to the keywords "pot", "air", and "fryer" that indicate that such keywords likely relate to a product class that is to be represented in the product ontology 112, while the tagger module 114 assigns a label to the keyword "instant" that indicates that such keyword does not likely relate to a product class that is to be represented in the product ontology 112.

With respect to the example keywords represented in FIG. 4, the tagger module 114 outputs sequences of keywords that have been assigned the labels that indicate that such keywords likely relate to a product class that is to be represented in the product ontology 112. These sequences of keywords are referred to herein as candidate phrases. The tagger module 114 can maintain the sequence of keywords as they occur in the queries corresponding to such keywords. In an example embodiment, the tagger module 114 is or includes a recurrent neural network (RNN) that has been trained with labeled queries, such that the tagger module 114 probabilistically identifies keywords in queries that likely relate to product classes that are to be represented in the product ontology 112. It is to be understood, however, that the tagger module 114 can be or include other machine learning algorithms/structures.

Figure 5:
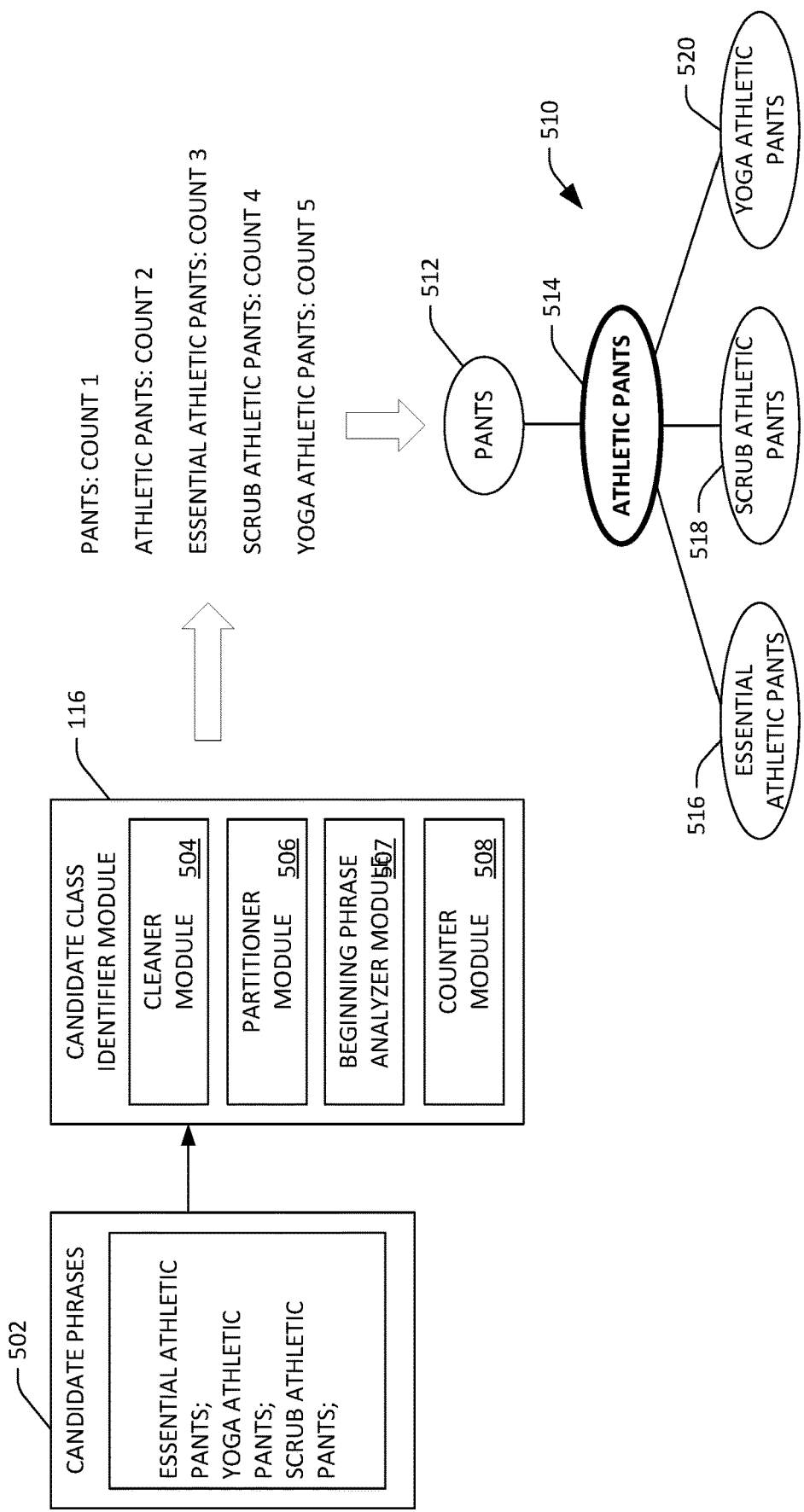
FIG. 5 is a schematic that depicts construction of a product ontology based upon candidate phrases.

Returning again FIG. 1, the class identifier system 110 includes a candidate class identifier module 116 that is configured to identify candidate product classes for inclusion in the ontology 112 based upon the candidate phrases output by the tagger module 114. Now referring to FIG. 5, a schematic that depicts operation of the candidate class identifier module 116 is illustrated. The candidate class identifier module 116 receives candidate phrases 502 output by the tagger module 114. In the example shown in FIG. 5, the candidate phrases include "essential athletic pants", "yoga athletic pants", and "scrub athletic pants". The candidate class identifier module 116 includes a cleaner module 504 that is configured to correct noise in the candidate phrases 502 and to normalize keywords in the candidate phrases 502. For instance, the cleaner module 504 is configured to reorder keywords in the phrases 502 that have been transposed by issuers of the query. In an example, the user issues the query "pants for the gym", and with respect to such query the tagger module 114 outputs the sequence of keywords "pants gym".

The cleaner module 504 can be configured to reorder the keywords from "pants gym" to "gym pants". The cleaner module 504 can perform this reordering by way of natural language processing (e.g., by recognizing that "pants" is not used as an adjective and therefore cannot modify "gym", while the keyword "gym" can be an adjective that modifies the keyword "pants"). In another example, the cleaner module 504 employs rules that define when keywords are to be reordered. In yet another example, multiple queries may include variations of a same base word. For instance, the candidate phrases 502 can include the phrases "conditioning cream" and "conditioner cream". These two phrases relate to a same product class; however, there is a variation in the suffix of the word "condition". The cleaner module 504 is configured to normalize keyword suffixes, such that "ing" is replaced in "conditioning" with "er", thereby forming the word "conditioner". The cleaner module 504 can further be configured to normalize tense and singular/plural nouns and pronouns. For instance, the cleaner module 504 is configured to convert plural nouns and pronouns to singular nouns and pronouns, unless the plural form of the noun or pronouns is semantically correct (e.g., "jeans"). Moreover, the cleaner module 504 can be configured to normalize tense, such that any verbs that may be included in the candidate phrases are assigned present tense (instead of past or future tense).

The candidate class identifier module 116 further includes a partitioner module 506 that is configured to partition multi-word phrases in the candidate phrases 502 into multiple phrases by sequentially expanding the ending phrases of such candidate phrases. For a candidate phrase with N keywords, the partitioner module 506 partitions the phrase into N phrases, with the ending phrase of the candidate phrase appearing in each of the N phrases. Pursuant to an example, the partitioner module 506 receives the phrase "essential athletic pants" from the candidate phrases 502 and partitions such phrase into the following three phrases: "pants", "athletic pants", and "essential athletic pants". Hence, the partitioner module 506 receives a multi-keyword phrase from the candidate phrases 502, and then extracts the ending phrase from the phrase (e.g., "pants"). Thereafter, the partitioner module 506 generates a second phrase by expanding the ending phrase by a keyword (e.g., "athletic pants"). The partitioner module 506 continues to expand the ending phrase one word at a time until the partitioner module 506 outputs the entirety of the candidate phrase. Phrases output by the partitioner module 506 are referred to herein as "candidate product classes."

The candidate class identifier module 116 can optionally include a beginning phrase analyzer module 507 that searches across candidate product classes for beginning phrases that co-occur frequently across several candidate product classes. For instance, queries include brand names set forth by users (e.g., "BRAND television", "BRAND telephone", "BRAND computer", etc.). In another example, an adjective is a beginning phrase across several candidate product classes (e.g., "best", "latest", etc.). When the beginning phrase analyzer model 507 ascertains that a threshold number or percentage of different candidate product classes include a same beginning phrase, the beginning phrase analyzer model 507 can optionally remove such beginning phrase from the candidate product classes (thereby potentially merging candidate product classes). Any suitable statistical method can be employed by the beginning phrase analyzer model 507 to ascertain which beginning phrases to remove from candidate product classes.

The candidate class identifier module 116 additionally includes a counter module 508 that counts a number of queries from which each of the candidate product classes output by the partitioner module 506 were extracted. In the example illustrated in FIG. 5, assume that the phrase "essential athletic pants" was extracted from 20 queries submitted by users of the search engine 302, the phrase "yoga athletic pants" was extracted from 15 queries submitted by users of the search engine 302, and the query "scrub athletic pants" was extracted from 10 queries submitted by users of the search engine 302. Therefore, presuming that there were no additional queries under consideration, the phrase "pants" was extracted from 45 queries and the phrase "athletic pants" was extracted from 45 queries. It is to be understood that the queries from which the phrase "essential athletic pants" was extracted may be the same query submitted numerous times by one or more users or different queries submitted by one or more users.

Based upon such counts, a candidate hierarchical portion of the product ontology 112 is constructed by the candidate class identifier module 116. In the example shown in FIG. 5, a candidate portion 510 of the ontology 112 can include a candidate product class 512 "pants" as a root node. "Pants" is the root node, as it is a single keyword and is an ending phrase of other candidate product classes. The candidate portion 510 of the ontology 112 further includes a candidate product class 514 "athletic pants" as an intermediate node. "Athletic pants" is a child of "pants", as the candidate product class "pants" is an ending phrase of the candidate product class "athletic pants".

The candidate portion 510 of the ontology 112 further includes product classes 516-520, where the product classes 516-520 are leaf nodes in the candidate portion 510 of the ontology 112 and are children of the product class "athletic pants" (as each of the product classes 516-520 includes the product class "athletic pants" as an ending phrase). Accordingly, the candidate class identifier module 116 can identify a hierarchical relationship amongst product classes based upon one product class being an ending phrase of another product class.

The counter module 508 can additionally filter candidate product classes from the candidate portion 510 of the ontology 112 based upon counts assigned to the candidate product classes by the counter module 508. In an example, the counter module 508 can filter a candidate product class from the candidate portion 510 of the ontology 112 when the count assigned to the candidate product class is beneath a first threshold. In an example, the first threshold is 25. As described previously, the count assigned to the candidate product class "pants" is 45, the count assigned to the candidate class "athletic pants" is 45, the count assigned to the candidate class "essential athletic pants" is 20, the count assigned to the candidate product class "scrub athletic pants" is 10, and the count assigned to the candidate product class "yoga athletic pants" is 15. The counter module 508 can therefore filter the candidate product classes 516-520 from the candidate portion 510 of the product ontology 112, as the counts assigned to the candidate product classes 516-520 are beneath the first threshold of 25. Therefore, the counter module 508 can remove the candidate product classes 516-520 from the candidate portion 510 of the ontology 112.

Rationale for filtering product classes is as follows. If millions of queries are considered when constructing the product ontology 112, and a candidate product class was extracted from a very small number of queries, then it can be presumed that the candidate product class is not representative of a product that is to be used to categorize a product. Contrarily, a candidate product class may be too general. For example, when millions of queries are employed to construct the product ontology 112, and a candidate product class has been extracted from several hundred thousand of the queries, it can be presumed that such candidate product class is too general to properly characterize products. For instance, if the candidate product class "pants" was extracted from several hundred thousand queries, but the candidate product class "athletic pants" was extracted from 1,500 queries, then it can be presumed that the candidate product class "athletic pants" has the appropriate granularity to be a leaf node in the product ontology 112. Therefore, the counter module 508 can prevent a candidate product class from being a leaf node in the product ontology 512 if the count assigned to the candidate product class is above a threshold and the candidate product class has at least one child product class.

Returning again to FIG. 1, the class identifier system 110 additionally includes an embedder module 118 that is configured to generate embeddings of the candidate product classes output by the candidate class identifier module 116. The embedder module 118 can use any suitable embedding technologies to generate embeddings for the candidate product classes output by the candidate class identifier module 116. Hence, the embedder module 118 transforms each product class output by the candidate class identifier module 116 into a vector representation of such candidate product class.

The class identifier system 110 additionally includes a cluster module 120 that is configured to cluster together candidate product classes output by the candidate class identifier module 116 that are approximately semantically equivalent to one another. For example, candidate product classes "automobile mats" and "car mats" are approximately semantically equivalent to one another. The cluster module 120 can create clusters of candidate product classes output by the candidate class identifier module 116, and clustered candidate product classes can be combined into a single product class. In the example set forth above, the candidate product classes "automobile mats" and "car mats" are combined into a single product class, where the single product class is the candidate product class that was extracted from the most queries in the queries 108 from amongst the combined candidate product classes. Therefore, if the candidate product class "car mats" was extracted from more queries than the candidate product class "automobile mats", the combined (single) product class is "car mats". Nevertheless, the combined product class is represented by both candidate phrases "car mats" and "automobile mats".

In an example embodiment, the cluster module 120 only clusters candidate product classes that are siblings in the ontology 112. Further, product classes that are parent nodes in the ontology are only considered for clustering if they have at least a threshold number of children. For instance, product classes with greater than five children are selected by the cluster module 120 for clustering. In yet another example, when child product classes are sufficiently generic (e.g., the child product classes have been extracted from a threshold number of queries), then the cluster module 120 may not consider a parent of such child product class for clustering. The cluster module 120 can use any suitable approach when clustering the embeddings of the product classes output by the embedder module 118. For instance, the cluster module 120 can employ clique-based clustering to group product classes. In an example, the cluster module 120 uses the Bron-Kerbosch algorithm to cluster product classes output by the candidate class identifier module 116.

Thus, the output of the class identifier system 110 is the product ontology 112, where the product ontology 112 includes product classes extracted from the queries 108, and further where the product ontology 112 is hierarchical, with hierarchical relationships being dependent upon ending phrases of product classes. The ontology 112 can be employed to categorize products, such that when a user issues a query to a search engine that has a product class that can be extracted therefrom, the search engine can return search results that represent products that belong to the product class.

The memory 104 further includes a relation identifier system 122, where the relation identifier system 122 is configured to identify, with respect to a product class in the ontology 112, one or more other product classes that are similar to the product class. More specifically, the relation identifier system 122 is configured to compute, with respect to a product class in the ontology 112, scores that are representative of similarities between the product class and other product classes in the ontology 112. For instance, the relation identifier system 122 ascertains that the product class "notebook computer" is similar to the product class "laptop PC", even though such product classes do not share a common ending phrase.

The relation identifier system 122 includes a class embedder module 124 that is configured to compute embeddings for product classes in the ontology 112. In an example, the embedder module 118 is the class embedder module 124. Put differently, the embeddings generated by the embedder module 118 may be the same embeddings used by the relation identifier system 122 in connection with identifying relationships between product classes in the ontology 112.

Figure 6:
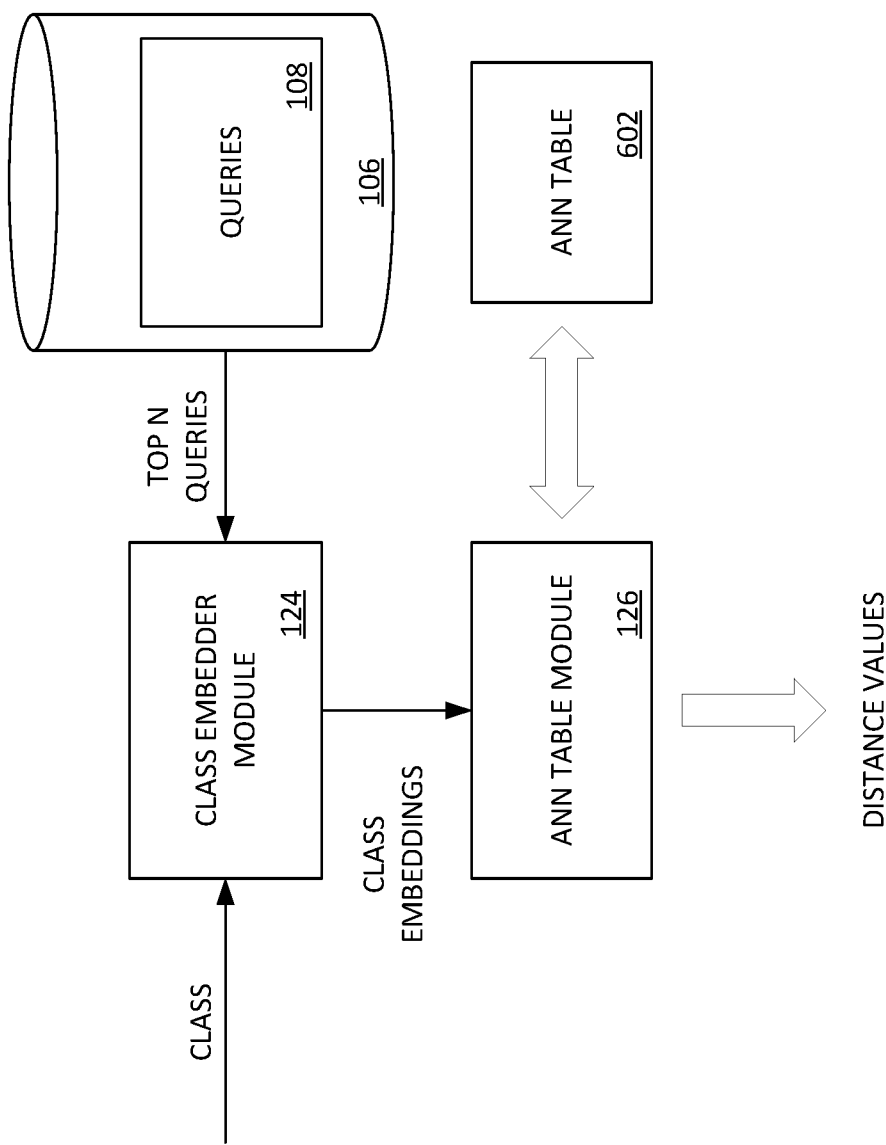
FIG. 6 is a schematic of a computer implemented system that is configured to output similarity scores for product classes in a product ontology, where a similarity score assigned to a product class is indicative of a similarity of the product class to another product class.

In another example, the class embedder module 124 generates embeddings for product classes based upon queries from which the product classes were extracted. Turning to FIG. 6, a functional block diagram that depicts example operation of the class embedder module 124 is illustrated. The class embedder module 124 retrieves a product class from the product ontology 112. As described previously, the product class includes a keyword or a sequence of keywords that have been extracted from one or more queries in the queries 108. Upon receiving the class, the class embedder module 124 can retrieve the top M queries from the queries 108 from which the product class was extracted. With more particularity, different users tend to submit the same query to a search engine when searching for information about a product. Hence, queries received by the search engine often include repeat queries. Therefore, a query may be issued numerous (e.g., thousands) of times by users of the search engine 302 over some window of time, where the product class is extracted from such query. The class embedder module 124, with respect to the received product class, can retrieve the N (e.g., 10) queries that were submitted the most by users of the search engine 302, where the product class was extracted from each of the M queries. In an example, N may be 10, 15, 20, or some other suitable value.

The class embedder module 124 may then generate embeddings for each of the M retrieved queries. In other words, each of the N queries is transformed into a respective vector representation of the query. The class embedder module 124 may then compute an average of the N embeddings to create can embedding for the product class.

Returning again to FIG. 1, the relation identifier system 122 further includes an approximate nearest neighbor (ANN) table module 126 that receives the class embeddings generated by the class embedder module 124 and constructs an ANN table that includes the class embeddings.

Referring back to FIG. 6, as described previously, the ANN table module 124 receives the class embeddings generated by the class embedder module 124 and generates an ANN table 602 that includes the class embeddings. For each product class represented in the ANN table 602, the ANN table module 124 can select some threshold number (e.g., M) of other product classes represented in the ANN table 602 that are closest to the product class in the ANN table 602 or are within some threshold distance from the product class in the ANN table 602. For instance, the ANN table module 124 can select a product class represented in the ANN table 602 and can subsequently identify the 100 product classes that are closest to the selected product class in the ANN table 602. When identifying the closest 100 (for example) product classes, the ANN table module 126 can compute distance values that are representative of distances between the product class and the 100 closest product classes. Therefore, the ANN table module 126 outputs distance values for each class in the ontology 112, where a distance value between a product class and another product class is indicative of similarity between the two product classes.

It is noted the and the ANN table module 126 is not limited to computing distance values between siblings in the ontology 112. Therefore, for instance, the ANN table module 126 can output a distance value between product classes "laptop computer" and "notebook PC" that indicates that such product classes are similar, despite such product classes not being siblings in the ontology 112 (as the two product classes do not share a common ending phrase).

Returning yet again to FIG. 1, the relation identifier system 122 can additionally include a search engine results page (SERP) similarity (SIM) module 128. The SERP SIM module 128, with respect to a product class, is configured to re-rank the M closest products classes with respect to the product class. It has been observed that re-ranking the M product classes with respect to the product class is beneficial in that the re-ranked classes better represent similarity between product classes.

Figure 7:
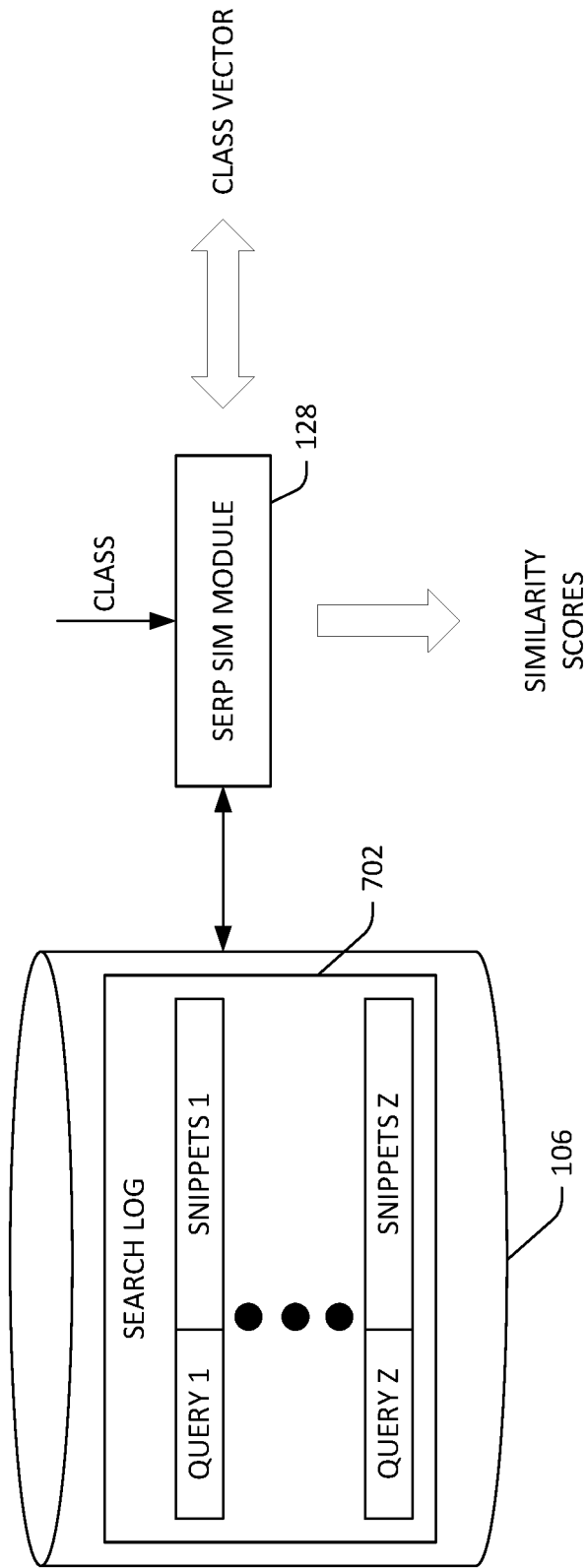
FIG. 7 is a schematic that illustrates a module that is configured to generate similarity scores for product classes based upon search results returned by a search engine.

Referring now to FIG. 7, a schematic that depicts operation of the SERP SIM module 128 is illustrated. The SERP SIM module 128 receives a product class and accesses a search log 702 stored in the data store 106. The search log 702 includes the queries 108 as well as snippets of a top threshold number of search results for the queries. In this example, the snippets include titles of search results and corresponding text presented with the titles of the search results on a search engine results page (SERP) returned to a user based upon a query. As with the class embedder module 124, the SERP SIM module 128 can retrieve a top threshold number of queries from which the product class was extracted as well as snippets corresponding to such queries. It can be ascertained that snippets for a same query provided to a search engine at different times may be different.

For each of the top threshold number of queries, the SERP SIM module 128 generates a frequency-based vector based upon keywords in the snippets for the queries. Put differently, for each query and each set of snippets corresponding thereto, the SERP SIM module 128 can generate a frequency-based vector that includes terms in the snippets and numbers of occurrences of such terms in the snippets. The SERP SIM module 128 can generate a vector for each query in the top threshold number of queries from which the product class was extracted. The SERP SIM module 128 may then generate a product class vector, where the vector is a frequency-based vector that is an average of the frequency-based vectors for each query in the top threshold number of queries. Therefore, the SERP SIM module 128 can construct a frequency-based vector for each product class (referred to as a product class vector).

The SERP SIM module 128 may then compute similarity scores between product classes based upon a comparison between product class vectors for the product classes. The SERP SIM module 128 can generate the similarity scores with respect to a product class for each of the M product classes. In an example, a similarity score computed by the SERP SIM module 128 between two product classes can be computed as follows:

$$\text{similarity score} = \frac{\sum w_{k \in V_i \cap V_j} f_k^i \cdot f_k^j}{\max(\max(V_i), V_j))^2}$$

where $w_k$ represents words common in the two vectors, $f_k^i$ and $f_k^j$ is the frequency of word $w_k$ in the two vectors, and $\max(V_i)$ is the max frequency of any word in vector $V_i$. Thus, the score is between zero and Z, where Z is the number of common words in the vectors. Again, the SERP SIM module 128 can re-rank product classes with respect to a product class based upon the similarity scores output by the SERP SIM module 128. In a different example, the SERP SIM module 128 can re-rank product classes with respect to a product class where the similarity scores are above a predefined threshold. Hence, the output of the SERP SIM module 128 can be product classes that are similar to one another.

Figure 8:
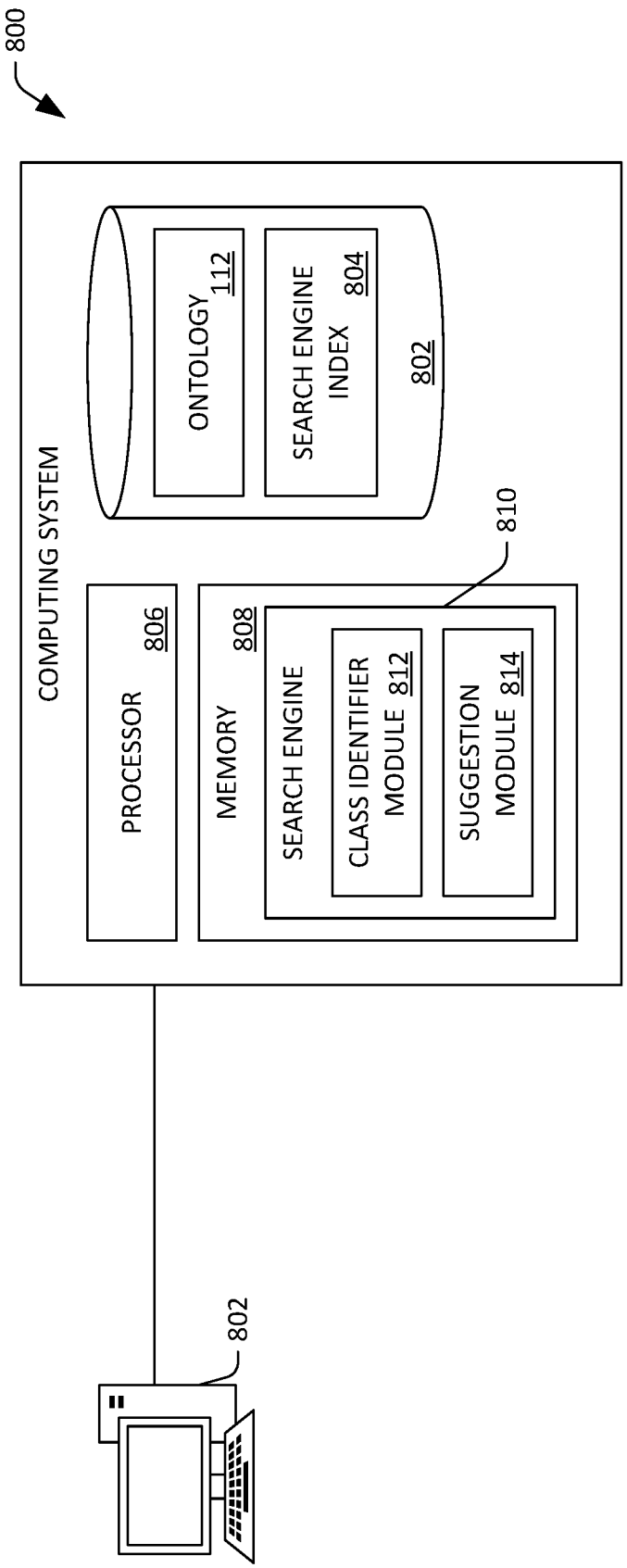
FIG. 8 is a functional block diagram of a computing system that is configured to return search results and/or a suggested query to a user based upon a product ontology.

Now referring to FIG. 8, a functional block diagram of a computing system 800 that is configured to provide output to a user based upon the ontology 112 constructed by the computing system 100 is illustrated. The computing system 800 is in communication with a client computing device 802, where a user of the client computing device 802 can submit a query to the computing system 800. The computing system 800 includes a data store 802, where the data store 802 includes the ontology 112 and a search engine index 804.

The computing system 800 further includes a processor 806 and memory 808, where the memory 808 includes a search engine 810. The search engine 810 includes a class identifier module 812 and a suggestion module 814.

In operation, the computing system 800 receives a query from the client computing device 802, where the query is set forth by a user of the client computing device 802. The search engine 810 receives the query, and determines whether the query is associated with a product class in the ontology 114. For instance, the class identifier module 812 processes the query to ascertain if a product class can be extracted from the query, where the product class is included in the ontology 112. In an example, the class identifier module 812 parses the query to identify a product class that is included in the ontology 112. When the class identifier module 812 extracts, from the query, a product class that is included in the ontology 112, the search engine 810 searches the search engine index 804 based upon the product class. For instance, the search engine 810 can limit search results returned to the client computing device 802 to search results that represent products that belong to the product class extracted from the query. Put differently, the search engine 810 can search the search engine index 804 based upon the query and can filter search results based upon the product class extracted from the query.

The suggestion module 814 is configured to provide a query suggestion to the user who submitted the query based upon the product class extracted from the query by the class identifier module 812. As described previously, the product class may have similar product classes associated therewith in the ontology 112, where the similar product classes have been identified based upon distance values output by the ANN table module 126 and similarity scores output by the SERP SIM module 128. The suggestion module 814 can provide a query suggestion to the user, where the query suggestion includes a product class that is identified as being similar in the ontology 112 to the product class extracted from the received query. Therefore, the suggestion module 814 can assist the user with query reformulation. In another example, the suggestion module 814 can identify a product class in the ontology 112 that has been determined to be somewhat similar to the product class extracted from the query. Hence, the suggestion module 814 can assist the user with exploring products that are related to the product class referenced in the query submitted by the user.

Therefore, the system 800 illustrates some applications where the ontology 112 is employed. There are, of course, other applications of the ontology 112. For instance, the ontology 112 can be employed in connection with training the tagger module 114, thereby improving operation of the tagger module 114. In another example, the ontology 112 can be employed to improve computer-implemented product understanding, can be employed in connection with computer-implemented advertisements, can be employed in connection with query understanding, etc. In another example, the ontology 112 can be employed in connection with recommending products to a user who issues a query. For instance, upon receipt of a query, it can be ascertained that the user is associated with a product class in the ontology 112. Products assigned to the product class (or products assigned to a related product class) can be returned as recommendations. In yet another example, the product ontology 112 can be employed in connection with indexing webpages. For example, a webpage includes information about a product (e.g., the webpage includes a product class in the ontology 112). When the webpage is crawled, it can be ascertained that the webpage includes the product class. In a search engine index, an entry for the webpage can include a label indicating that the webpage includes information relating to the product class. Other examples are contemplated.

Figure 9:
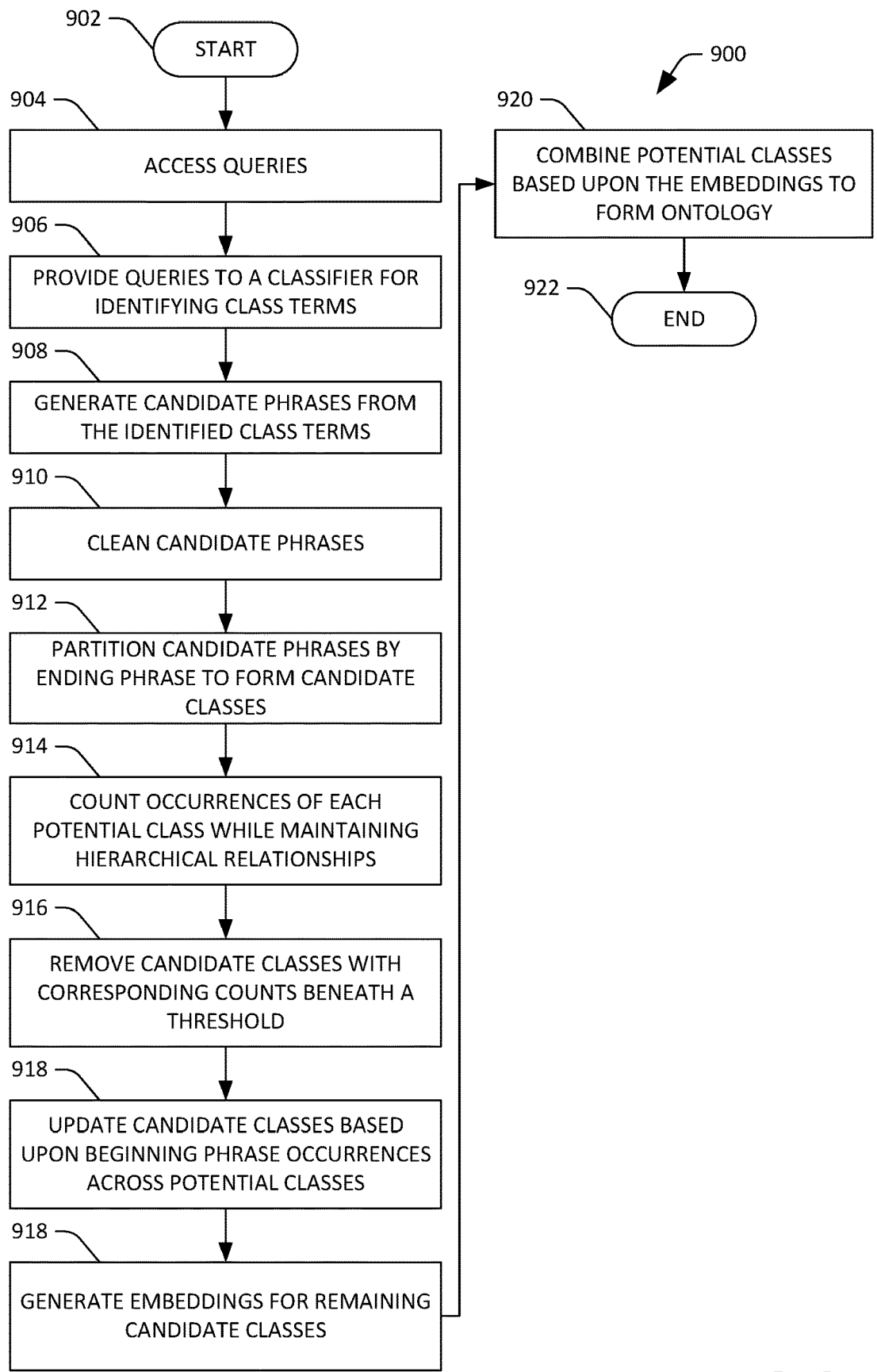
FIG. 9 is a flow diagram that illustrates an example methodology for constructing a product ontology based upon queries submitted to a search engine.
Figure 10:
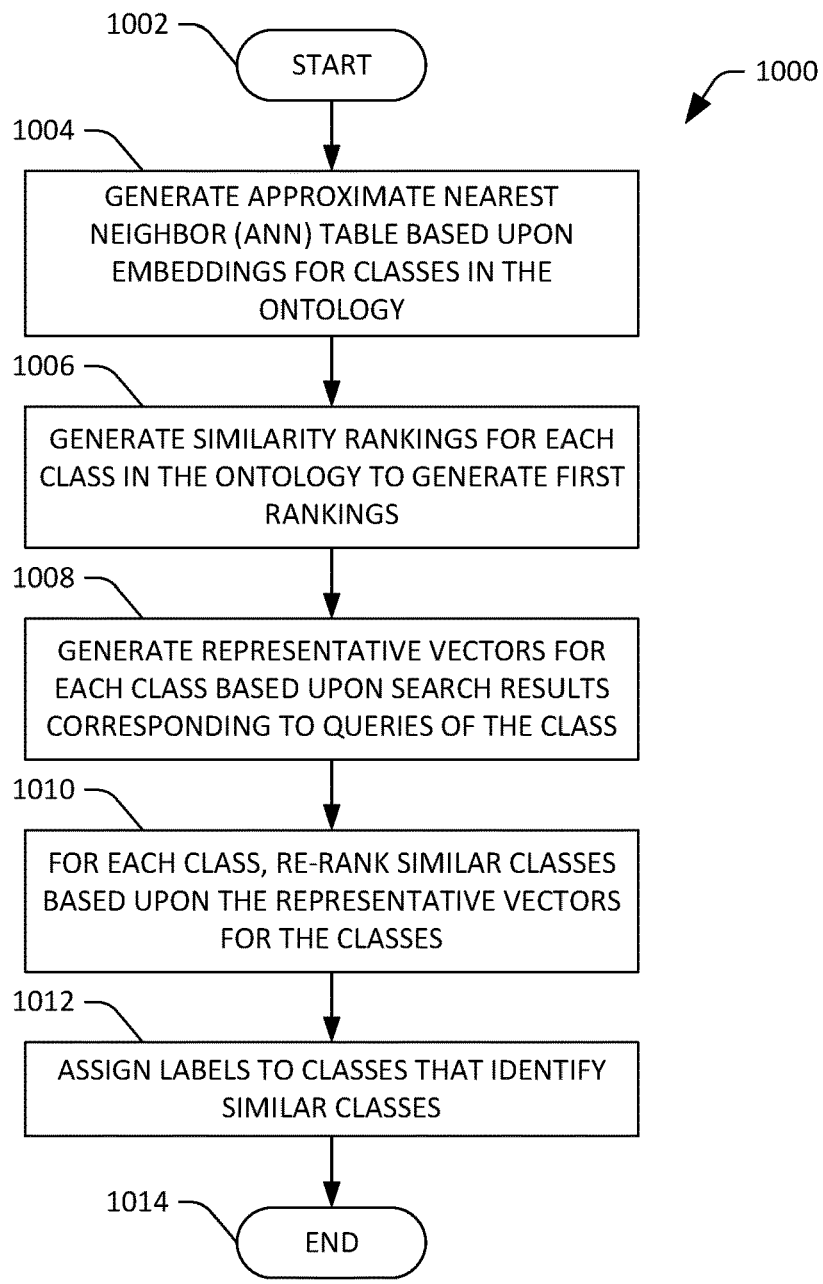
FIG. 10 is a flow diagram that illustrates an example methodology for identifying relationships between product classes in a product ontology.
Figure 11:
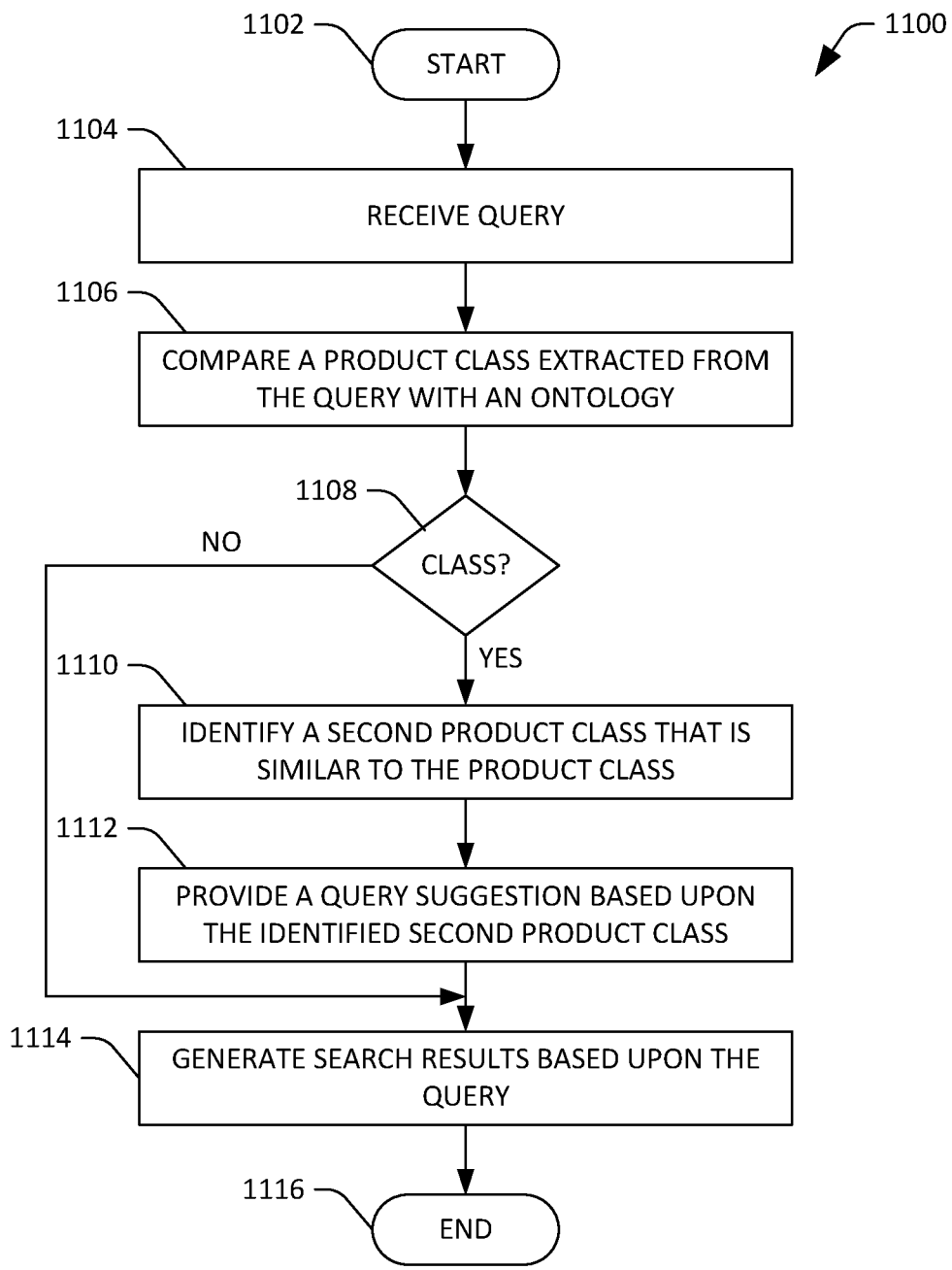
FIG. 11 is a flow diagram that illustrates an example methodology for providing a query suggestion to a user who submitted a query, where the query suggestion is provided based upon a product ontology.

FIGS. 9-11 illustrate example methodologies relating to creation and use of a product ontology. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now solely to FIG. 9, a flow diagram illustrating an example methodology 900 for constructing a product ontology based upon queries submitted to a search engine and/or an e-commerce application is illustrated. The methodology 900 starts at 902, and at 904 queries that have been submitted to the search engine and/or e-commerce application over some predefined window of time are accessed.

At 906, each of the accessed queries is provided to a classifier (e.g., the tagger module 114), where the classifier is configured to identify keywords that are likely related to a product class that is to be included in the ontology 112. Such keywords are referred to herein as "class terms". At 908, candidate phrases are generated from the identified class terms. As described previously, the candidate phrases can be generated by placing the class terms identified by the classifier in a sequence that corresponds to the sequence in which the class terms occurred in the queries.

At 910, the candidate phrases are subjected to cleaning, where cleaning can include replacing plural terms with singular terms, arranging keywords in semantically meaningful ways, removing stop words, etc. At 912, the cleaned candidate phrases are partitioned by ending phrase to form a candidate product classes. For instance, a candidate phrase that includes Q keywords is partitioned into Q candidate product classes, where a first candidate product class is an ending phrase of the candidate phrase, a second candidate product class is a two-term ending phrase of the candidate phrase, etc.

At 914, a number of occurrences of each candidate class is counted, where hierarchical relationships between candidate classes are maintained. Pursuant to an example, the two-keyword candidate product class referenced above is a child of the single keyword candidate product class.

At 916, candidate product classes having a count beneath a threshold are filtered. At 918, the candidate product classes are updated based upon the co-occurrences of beginning phrases across candidate product classes. Hence, if a beginning phrase occurs across too many classes, the beginning phrase can be deemed to be an adjective or brand name and can be removed from the candidate product class.

At 920, embeddings are generated for the remaining candidate product classes. At 920, candidate product classes are combined based upon the embeddings, where an ontology is completed after the candidate product classes have been combined. The methodology 900 completes at 922.

With reference now to FIG. 10, a flow diagram illustrating an example methodology 1000 for identifying similar product classes is depicted. The methodology starts at 1000, and at 1002 an ANN table is generated based upon embeddings for product classes in the ontology. As described above, the embeddings for the product classes in the ontology can be generated based upon queries from which the product classes were extracted (e.g., for a product class, the embedding for such class is generated based upon a top threshold number of queries from which the product class was extracted).

At 1006, for each product class in the ontology, similarity scores between the class and some threshold number of closest classes (as identified in the ANN table) are generated. The similarity scores are representative of distances between the product class and the closest product classes to the product class in the ANN table. With respect to a product class, the threshold number of closest product classes in the ANN table can be ranked based upon the similarity scores.

At 1008, representative vectors are generated for each product class based upon snippets (including titles) of search results corresponding to queries from which the product class was extracted. At 1010, the top threshold number of most similar products classes to a product class are re-ranked based upon the representative vectors for the product classes. At 1012, labels are assigned to classes that identify classes that are similar to such class. The methodology 1000 completes at 1014.

Now referring to FIG. 11, a flow diagram illustrating an example methodology 1100 for providing a query suggestion to a user and returning search results to the user based upon a product class ontology is illustrated. The methodology 1100 starts at 1102, and at 1104 a query is received at a search engine or e-commerce application from a client computing device. At 1106, a product class extracted from the query is compared with an ontology generated by way of the methodologies 900 and 1000.

At 1108, a determination is made regarding whether the product class extracted from the query is included in the ontology. When the product class extracted from the query is included in the ontology, the methodology 1100 proceeds to 1110, where a second product class in the ontology is identified, where the second product class is labeled in the ontology as being similar to the product class extracted from the query. At 1112, a query suggestion is provided to the user based upon the second product class identified at 1110, where the query suggestion, for example, includes the identified second product class.

At 1114, search results are generated based upon the query. When the product class has been extracted from the query, the search results can be limited to products that have been categorized as belonging to the product class. When, at 1108, it is determined that a product class in the ontology cannot be extracted from the query, the methodology 1100 proceeds to 1114, where search results are returned to the user based upon the query. The methodology 1100 completes at 1116.

Figure 12:
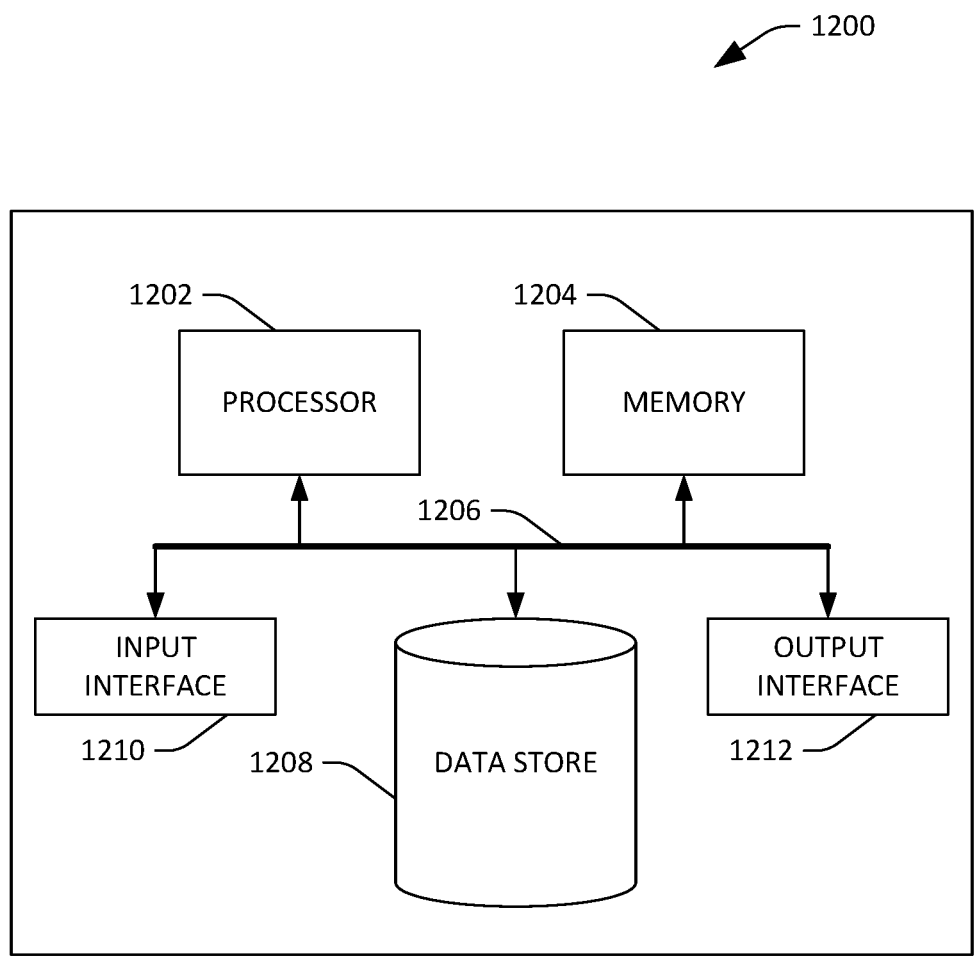
FIG. 12 is an example computing system.

Referring now to FIG. 12, a high-level illustration of an example computing device 1200 that can be used in accordance with the systems and methodologies disclosed herein is illustrated. For instance, the computing device 1200 may be used in a system that automatically generates a product ontology based upon queries. By way of another example, the computing device 1200 can be used in a system that provides query suggestions based upon a product ontology. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store search logs, distance values, similarity scores, etc.

The computing device 1200 additionally includes a data store 1208 that is accessible by the processor 1202 by way of the system bus 1206. The data store 1208 may include executable instructions, search logs, snippets, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

The features described herein relate to computer-implemented approaches for constructing a product ontology based upon queries submitted to a search engine according to at least the examples provided below.

(A1) In one aspect, some embodiments include a method for constructing a computer-implemented product ontology based upon queries submitted to a search engine. The method includes obtaining the queries submitted to the search engine, where the queries include a query that comprises a sequence of terms. The method also includes identifying, based upon the sequence of terms, a first phrase and a second phrase, where the second phrase includes more terms than the first phrase, and further where the first phrase is an ending phrase of the second phrase. The method further includes constructing the computer-implemented product ontology based upon the first phrase being the ending phrase of the second phrase such that the product ontology comprises a first product class represented by the first phrase and a second product class represented by the second phrase. The second product class is a child of the first product class in the product ontology based upon the first phrase being the ending phrase of the second phrase. Additionally, the search engine, upon receipt of a user query, causes information to be returned to a client computing device based upon the user query being associated with at least one of the first product class or the second product class in the computer-implemented product ontology.

(A2) In some embodiments of the method of A1, the method also includes providing, prior to identifying the first phrase and the second phrase, the query as input to a computer-implemented classifier, where the computer-implemented classifier is configured to assign a respective label to each term in the sequence of terms in the query, and further where each label indicates whether the term potentially corresponds to an arbitrary product class. The method also includes receiving, from the computer-implemented classifier, labels respectively assigned to the terms in the sequence of terms, wherein a subset of the labels indicate that corresponding terms potentially correspond to the arbitrary product class, and further wherein the first phrase and the second phrase are identified based upon the subset of the labels.

(A3) In some embodiments of the method of A2, the corresponding terms include the first phrase and the second phrase.

(A4) In some embodiments of at least one of the methods of A1-A3, the queries include a second query that comprises a second sequence of terms. The method also includes identifying, based upon the second sequence of terms, a third phrase and generating a first embedding for the first phrase, where the first embedding represents semantics of the first phrase. The method further includes generating a second embedding for the third phrase, where the second embedding represents semantics of the third phrase. The method additionally includes clustering the first embedding and the second embedding in a same cluster based upon a computed distance between the first embedding and the second embedding, wherein the first product class is further represented by the third phrase based upon the first embedding and the second embedding being clustered into the same cluster.

(A5) In some embodiments of at least one of the methods of A1-A4, constructing the computer-implemented product ontology includes identifying phrases in the queries and computing a number of occurrences of the second phrase in the phrases. Constructing the computer-implemented product ontology further includes comparing the number of occurrences of the second phrase with a threshold, wherein the second product class is included in the computer-implemented ontology upon determining that the number of occurrences of the second phrase in the phrases exceeds the threshold.

(A6) In some embodiments of the method of A5, the method also includes identifying, based upon the sequence of terms, a third phrase that includes more terms than the second phrase, where the third phrase is an ending phrase of the second phrase. The method additionally includes computing a number of occurrences of the third phrase in the phrases and comparing the number of occurrences of the third phrase with the threshold, wherein the computer-implemented product ontology fails to include a product class represented by the third phrase due to the number of occurrences of the third phrase being beneath the threshold.

(A7) In some embodiments of at least one of the methods of A1-A6, the method also includes receiving the user query and identifying that at least one of the first product class or the second product class based upon the user query. The method further includes identifying a search result based upon the at least one of the first product class or the second product class, where the information returned to the client computing device comprises the search result.

(A8) In some embodiments of at least one of the methods of A1-A7, the method also includes receiving the user query and identifying the first product class based upon the user query. The method additionally includes identifying the second phrase as a suggested query based upon the second product class being a child of the first product class in the computer-implemented product ontology, where the information returned to the client computing device comprises the second phrase as the suggested query.

(A9) In some embodiments of at least one of the methods of A1-A8, the computer-implemented product ontology includes a third product class represented by a third phrase, and the method further includes computing a score, where the score indicates that the third product class is related to the second product class, and further where the information returned to the client computing device is based upon the computed score.

(A10) In some embodiments of the method of A9, computing the score includes generating a first embedding for the second product class, where the first embedding is generated based upon a first set of queries from which the second phrase was extracted. Computing the score also includes generating a second embedding for the third product class, where the second embedding is generated based upon a second set of queries from which the third phrase was extracted. Computing the score additionally includes computing a distance between the first embedding and the second embedding, where the score is based upon the distance between the first embedding and the second embedding.

(A11) In some embodiments of the method of A10, computing the score also includes generating a first class vector for the second product class, where the first class vector is based upon search results that correspond to the first set of queries. Computing the score also includes generating a second class vector for the third product class, where the second class vector is based upon search results that correspond to the second set of queries, where the score is based upon the first class vector and the second class vector.

(A12) In some embodiments of the method of A9, the method also includes receiving the user query and identifying the second product class based upon the user query. The method further includes identifying the third product class based upon the second product class and the score, where the information returned to the client computing device corresponds to the third product class.

(B1) In another aspect, some embodiments include a method for constructing a product ontology that is configured for use by a search engine when returning information to a client computing device in response to receipt of a user query. The method includes obtaining queries previously submitted to the search engine by users of the search engine, where the queries include a query that comprises a sequence of terms. The method also includes identifying a first phrase based upon the sequence of terms, where the first phrase includes several terms. The method additionally includes extracting a second phrase from the first phrase, where the second phrase includes fewer terms than the first phrase and is at an end of the first phrase. The method further includes constructing the product ontology based upon the first phrase and the second phrase such that the constructed product ontology includes a first product class represented by the first phrase and a second product class represented by the second phrase, where the first product class is a child of the second product class in the product ontology due to the second phrase being included in the first phrase and being at the end of the first phrase. The search engine, upon receipt of the user query, causes information to be returned to a client computing device based upon the user query being associated with at least one of the first product class or the second product class in the product ontology.

(B2) In some embodiments of the method of B1, the information returned to the client computing device includes a recommendation for a product that is assigned to the at least one of the first product class or the second product class.

(B3) In some embodiments of at least one of the methods of B1-B2, the information returned to the client computing device includes a suggested query, the suggested query includes at least one of the first phrase or the second phrase.

(B4) In some embodiments of at least one of the methods of B1-B3, the method also includes generating an entry for a webpage in a computer-readable index that is searched by the search engine, wherein the webpage includes the first phrase, and further wherein the index includes a label that indicates that the webpage corresponds to the first product class due to the webpage including the first phrase.

(B5) In some embodiments of at least one of the methods of B1-B4, the product ontology includes a third product class represented by a third phrase, where the third product class is not a child of the second product class. The method also includes computing a score with respect to the first product class and the third product class, where the score indicates that the first product class is related to the third product class. The method further includes upon receiving the user query, associating the user query with the first product class, where the information returned to the client computing device is identified based upon the score with respect to the first product class and the third product class.

(B6) In some embodiments of at least one of the methods of B1-B5, the method also includes identifying phrases based upon the obtained queries and computing a number of occurrences of the first phrase in the phrases. The method further includes comparing the number of occurrences of the first phrase with a threshold, where the first product class is included in the computer-implemented ontology based upon the number of occurrences of the second phrase in the phrases exceeding the threshold.

(B7) In some embodiments of at least one of the methods of B1-B6, the method also includes identifying a third phrase in a second query of the obtained queries, wherein the third phrase is different from the first phrase but includes the second phrase at an end of the third phrase. The method additionally includes clustering phrases identified based upon the queries, where the first phrase and the second phrase are included in a same cluster, and further where constructing the product ontology comprises representing the first product class with both the first phrase and the third phrase due to the first phrase and the third phrase both including the second phrase at the ends of the first phrase and the third phrase and further due to the first phrase and the third phrase being included in the same cluster.

(C1) In yet another aspect, in some embodiments a computing system includes a processor and memory that stores instructions that, when executed by the processor, cause the processor to perform any of the methods described herein (e.g., any of A1-A12 or B1-B7).

(D1) In still yet another aspect, in some embodiments a computer-readable storage medium includes instructions that, when executed by a processor, cause the processor to perform any of the methods described herein (e.g., any of A1-A12 or B1-B7).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to construct a computer-implemented product ontology based upon queries submitted to a search engine, the computing system comprising:
   a processor; and
   memory storing instructions that, when executed by the processor, cause the processor to perform acts comprising:
      obtaining a plurality of queries submitted to the search engine, wherein a query of the plurality of queries comprises a sequence of terms;
      identifying, based upon a sequence of terms of a first query, a first phrase and a second phrase;
      extracting the second phrase from the first phrase, wherein the second phrase includes fewer terms than the first phrase and is at an end of the first phrase; and
      constructing the computer-implemented product ontology based upon an occurrence of the first phrase and an occurrence of the second phrase within the plurality of queries, wherein the product ontology comprises a first product class represented by the first phrase and a second product class represented by the second phrase, wherein the second product class is a child of the first product class in the product ontology based upon the first phrase being the ending phrase of the second phrase;
      responsive to receiving an indication that a user query has been received by the search engine, providing the user query as input into a pre-trained machine learning model, wherein the pre-trained machine learning model has been trained upon labeled queries submitted to the search engine, wherein labels assigned to the labeled queries are indicative of whether a query of the labeled queries corresponds to an intent to acquire information about a product; and
      responsive to obtaining an output of the pre-trained machine learning model indicative of an intent of the user query to acquire information about a product, causing information to be returned to a client computing device based upon the user query being associated with at least one of the first product class or the second product class in the computer-implemented product ontology.

2. The computing system of claim 1, the acts further comprising:
   prior to identifying the first phrase and the second phrase, providing the first query as input to a computer-implemented classifier, wherein the computer-implemented classifier is configured to assign a respective label to each term in the sequence of terms in the first query, and further wherein each label indicates whether the term potentially corresponds to an arbitrary product class; and
   receiving, from the computer-implemented classifier, labels respectively assigned to the terms in the sequence of terms, wherein a subset of the labels indicate that corresponding terms potentially correspond to the arbitrary product class, and further wherein the first phrase and the second phrase are identified based upon the subset of the labels.

3. The computing system of claim 2, wherein the corresponding terms include the first phrase and the second phrase.

4. The computing system of claim 1, wherein the plurality of queries include a second query that comprises a second sequence of terms, the acts further comprising:
   identifying, based upon the second sequence of terms, a third phrase;
   generating a first embedding for the first phrase, wherein the first embedding represents semantics of the first phrase;
   generating a second embedding for the third phrase, wherein the second embedding represents semantics of the third phrase; and
   clustering the first embedding and the second embedding in a same cluster based upon a computed distance between the first embedding and the second embedding, wherein the first product class is further represented by the third phrase based upon the first embedding and the second embedding being clustered into the same cluster.

5. The computing system of claim 1, wherein constructing the computer-implemented product ontology comprises:
   identifying phrases in the queries;
   computing a number of occurrences of the second phrase in the phrases; and
   comparing the number of occurrences of the second phrase with a threshold, wherein the second product class is included in the computer-implemented ontology upon determining that the number of occurrences of the second phrase in the phrases exceeds the threshold.

6. The computing system of claim 5, the acts further comprising:
   identifying, based upon the sequence of terms, a third phrase that includes more terms than the second phrase, wherein the third phrase is an ending phrase of the second phrase;
   computing a number of occurrences of the third phrase in the phrases; and
   comparing the number of occurrences of the third phrase with the threshold, wherein the computer-implemented product ontology fails to include a product class represented by the third phrase due to the number of occurrences of the third phrase being beneath the threshold.

7. The computing system of claim 1, the acts further comprising:
   receiving the user query;
   identifying that the user query is associated with at least one of the first product class or the second product class based upon the user query; and
   identifying a search result based upon the at least one of the first product class or the second product class, wherein the information returned to the client computing device comprises the search result.

8. The computing system of claim 1, the acts further comprising:
   receiving the user query;
   identifying the first product class based upon the user query; and
   identifying the second phrase as a suggested query based upon the second product class being a child of the first product class in the computer-implemented product ontology, wherein the information returned to the client computing device comprises the second phrase as the suggested query.

9. The computing system of claim 1, wherein the computer-implemented product ontology comprises a third product class represented by a third phrase, the acts further comprising:
   computing a score, wherein the score indicates that the third product class is related to the second product class, and further wherein the information returned to the client computing device is based upon the computed score.

10. The computing system of claim 9, wherein computing the score comprises:
   generating a first embedding for the second product class, wherein the first embedding is generated based upon a first set of queries from which the second phrase was extracted; and
   generating a second embedding for the third product class, wherein the second embedding is generated based upon a second set of queries from which the third phrase was extracted; and
   computing a distance between the first embedding and the second embedding, wherein the score is based upon the distance between the first embedding and the second embedding.

11. The computing system of claim 10, wherein computing the score further comprises:
   generating a first class vector for the second product class, wherein the first class vector is based upon search results that correspond to the first set of queries; and
   generating a second class vector for the third product class, wherein the second class vector is based upon search results that correspond to the second set of queries, wherein the score is based upon the first class vector and the second class vector.

12. The computing system of claim 9, the acts further comprising:
   receiving the user query;
   identifying the second product class based upon the user query; and
   identifying the third product class based upon the second product class and the score, wherein the information returned to the client computing device corresponds to the third product class.

13. A computer-implemented method for constructing a product ontology that is configured for use by a search engine when returning information to a client computing device in response to receipt of a user query, the method comprising:
   obtaining queries previously submitted to the search engine by users of the search engine, wherein the queries include a query that comprises a sequence of terms;
   identifying a first phrase based upon the sequence of terms, wherein the first phrase includes several terms;
   extracting a second phrase from the first phrase, wherein the second phrase includes fewer terms than the first phrase and is at an end of the first phrase; and
   constructing the product ontology based upon an occurrence of the first phrase and an occurrence of the second phrase within the queries, wherein the constructed product ontology includes a first product class represented by the first phrase and a second product class represented by the second phrase, wherein the first product class is a child of the second product class in the product ontology due to the second phrase being included in the first phrase and being at the end of the first phrase;
   upon receipt of the user query, providing the user query as input into a pre-trained machine learning model, wherein the pre-trained machine learning model has been trained upon labeled queries submitted to the search engine, wherein labels assigned to the labeled queries are indicative of whether a query of the labeled queries corresponds to an intent to acquire information about a product; and
   responsive to obtaining an output of the pre-trained machine learning model indicative of an intent of the user query to acquire information about a product, causing information to be returned to a client computing device based upon the user query being associated with at least one of the first product class or the second product class in the product ontology.

14. The method of claim 13, wherein the information returned to the client computing device is a recommendation for a product that is assigned to the at least one of the first product class or the second product class.

15. The method of claim 13, wherein the information returned to the client computing device is a suggested query, the suggested query comprising at least one of the first phrase or the second phrase.

16. The method of claim 13, further comprising:
generating an entry for a webpage in a computer-readable index that is searched by the search engine, wherein the webpage includes the first phrase, and further wherein the index includes a label that indicates that the webpage corresponds to the first product class due to the webpage including the first phrase.

17. The method of claim 13, wherein the product ontology includes a third product class represented by a third phrase, wherein the third product class is not a child of the second product class, the method further comprising:
computing a score with respect to the first product class and the third product class, wherein the score indicates that the first product class is related to the third product class; and
upon receiving the user query, associating the user query with the first product class, wherein the information returned to the client computing device is identified based upon the score with respect to the first product class and the third product class.

18. The method of claim 13, further comprising:
identifying phrases based upon the obtained queries;
computing a number of occurrences of the first phrase in the phrases; and
comparing the number of occurrences of the first phrase with a threshold, wherein the first product class is included in the computer-implemented ontology based upon the number of occurrences of the second phrase in the phrases exceeding the threshold.

19. The method of claim 13, further comprising:
identifying a third phrase in a second query of the obtained queries, wherein the third phrase is different from the first phrase but includes the second phrase at an end of the third phrase; and
clustering phrases identified based upon the queries, wherein the first phrase and the second phrase are included in a same cluster, and further wherein constructing the product ontology comprises representing the first product class with both the first phrase and the third phrase due to the first phrase and the third phrase both including the second phrase at the ends of the first phrase and the third phrase and further due to the first phrase and the third phrase being included in the same cluster.

20. A computer-readable storage medium comprising instructions that, when executed by a processor, cause the processor to perform acts comprising:
obtaining queries previously submitted to a search engine by users of the search engine, wherein the queries include a query that comprises a sequence of terms;
identifying a first phrase based upon the sequence of terms, wherein the first phrase includes several terms;
extracting a second phrase from the first phrase, wherein the second phrase includes fewer terms than the first phrase and is at an end of the first phrase; and
constructing a product ontology based upon an occurrence of the first phrase and an occurrence of the second phrase within the queries, wherein the constructed product ontology includes a first product class represented by the first phrase and a second product class represented by the second phrase, wherein the first product class is a child of the second product class in the product ontology due to the second phrase being included in the first phrase and being at the end of the first phrase;
upon receipt of the user query, providing the user query as input into a pre-trained machine learning model, wherein the pre-trained machine learning model has been trained upon labeled queries submitted to the search engine, wherein labels assigned to the labeled queries are indicative of whether a query of the labeled queries corresponds to an intent to acquire information about a product; and
responsive to obtaining an output of the pre-trained machine learning model indicative of an intent of the user query to acquire information about a product, causing information to be returned to a client computing device based upon the user query being associated with at least one of the first product class or the second product class in the product ontology.

\* \* \* \* \*